(12) United States Patent
Voth et al.

(10) Patent No.: US 10,000,027 B2
(45) Date of Patent: Jun. 19, 2018

(54) APPARATUS AND METHOD FOR RESHAPING PLASTIC PREFORMS INTO PLASTIC CONTAINERS WITH AN AUTOMATIC CHANGING DEVICE FOR HANDLING PARTS

(71) Applicant: KRONES AG, Neutraubling (DE)

(72) Inventors: Klaus Voth, Obertraubling (DE); Wolfgang Schoenberger, Brennberg (DE)

(73) Assignee: KRONES AG (DE)

( * ) Notice: Subject to any disclaimer, the term of this patent is extended or adjusted under 35 U.S.C. 154(b) by 278 days.

(21) Appl. No.: 14/643,706

(22) Filed: Mar. 10, 2015

(65) Prior Publication Data

US 2015/0251366 A1  Sep. 10, 2015

(30) Foreign Application Priority Data

Mar. 10, 2014 (DE) .................. 10 2014 103 159

(51) Int. Cl.
*B29C 31/00* (2006.01)
*B29C 49/42* (2006.01)
(Continued)

(52) U.S. Cl.
CPC .............. *B29D 22/003* (2013.01); *B25J 5/02* (2013.01); *B25J 9/0081* (2013.01);
(Continued)

(58) Field of Classification Search
CPC .............. B29C 31/006; B29C 49/4205; B29C 2049/4858; B29C 2049/283
See application file for complete search history.

(56) References Cited

U.S. PATENT DOCUMENTS 4,655,676 A * 4/1987 Jannborg ............... B25J 9/0018
29/792
5,342,161 A 8/1994 Shimoichi et al. ........... 414/416
(Continued)

FOREIGN PATENT DOCUMENTS

CN 104321183 1/2015 ............. B29C 31/00
DE 4301569 10/1993 ............. B21D 43/00
(Continued)

OTHER PUBLICATIONS

German Search Report (no translation) issued in application No. 10 2014 103 159.8, dated Dec. 9, 2014 (8 pgs).
(Continued)

*Primary Examiner* — Robert B Davis
(74) *Attorney, Agent, or Firm* — Hayes Soloway P.C.

(57) ABSTRACT

A plant for reshaping plastic preforms into plastic containers, includes a heating device for heating the plastic preforms, and a device for reshaping the plastic preforms into the plastic containers, arranged downstream of the heating device in the transport direction of the plastic preforms, wherein the reshaping device includes a transport device, which transports the plastic preforms along a predefined transport path and wherein the transport device has a station carrier on which a multitude of reshaping stations are arranged, each having blow mold devices each arranged on blow mold carriers. The reshaping device includes a changing device, which is suited and intended for at least removing and/or attaching the blow mold devices to the blow mold carriers, wherein this changing device is further suited and intended for at least removing and/or attaching the changeable element to the heating device.

22 Claims, 7 Drawing Sheets

(51) Int. Cl.
*B29C 49/48* (2006.01)
*B29D 22/00* (2006.01)
*B29C 49/28* (2006.01)
*B29C 49/64* (2006.01)
*B25J 5/02* (2006.01)
*B25J 9/00* (2006.01)
*B29C 49/06* (2006.01)
*B29L 31/00* (2006.01)

(52) U.S. Cl.
CPC ............ *B29C 31/006* (2013.01); *B29C 49/28* (2013.01); *B29C 49/4205* (2013.01); *B29C 49/4268* (2013.01); *B29C 49/48* (2013.01); *B29C 49/6409* (2013.01); *B29C 49/06* (2013.01); *B29C 2049/283* (2013.01); *B29C 2049/4858* (2013.01); *B29L 2031/7158* (2013.01)

(56) References Cited

U.S. PATENT DOCUMENTS

| | | | | |
|---|---|---|---|---|
| 8,235,698 | B2* | 8/2012 | Schonberger | B29C 49/4205 425/182 |
| 8,491,293 | B2 | 7/2013 | Meinzinger et al. | B29C 49/36 |
| 8,505,268 | B2 | 8/2013 | Stoiber et al. | 53/55 |
| 8,567,589 | B2* | 10/2013 | Schonberger | B29C 49/4205 198/465.4 |
| 8,974,211 | B2 | 3/2015 | Cirette et al. | 425/182 |
| 9,227,345 | B2 | 1/2016 | Cirette et al. | B29C 31/006 |
| 2011/0052747 | A1* | 3/2011 | Meinzinger | B29C 49/48 425/541 |
| 2012/0126461 | A1 | 5/2012 | Duclos et al. | 264/523 |
| 2014/0305076 | A1* | 10/2014 | Winzinger | B65C 9/0062 53/201 |
| 2015/0145180 | A1 | 5/2015 | Finger et al. | B29C 49/4205 |
| 2015/0151455 | A1 | 6/2015 | Cirette et al. | B29C 31/006 |

FOREIGN PATENT DOCUMENTS

| | | | |
|---|---|---|---|
| DE | 102009040977 | 3/2011 | ............ B65B 57/00 |
| DE | 102011054890 A1 * | 5/2013 | ............ B65C 9/0062 |
| EP | 2258534 | 12/2010 | ............ B29C 49/42 |
| EP | 2292402 | 3/2011 | ............ B29C 31/00 |
| EP | 2878423 | 6/2015 | ............ B29C 49/48 |
| FR | 2990639 | 11/2013 | ............ B29C 49/42 |
| WO | WO2011026963 | 3/2011 | ............ B29C 31/00 |
| WO | WO2012120031 | 9/2012 | ............ B29C 31/00 |
| WO | WO 2013174711 A1 * | 11/2013 | ......... B29C 49/4205 |

OTHER PUBLICATIONS

Chinese Office Action issued in application No. 201510102189X, dated Jun. 30, 2016 (18 pgs).

European Search Report issued in application No. 15158527.0, dated Aug. 7, 2015 (7 pgs).

European Office Action (w/machine translation) issued in application No. 15 158 527.0, dated Dec. 21, 2017 (12 pgs).

European Search Report (w/machine translation) issued in application No. 17190108.5, dated Jan. 9, 2018 (28 pgs).

European Search Report (w/machine translation) issued in application No. 17206826.4, dated Mar. 27, 2018 (14 pgs).

* cited by examiner

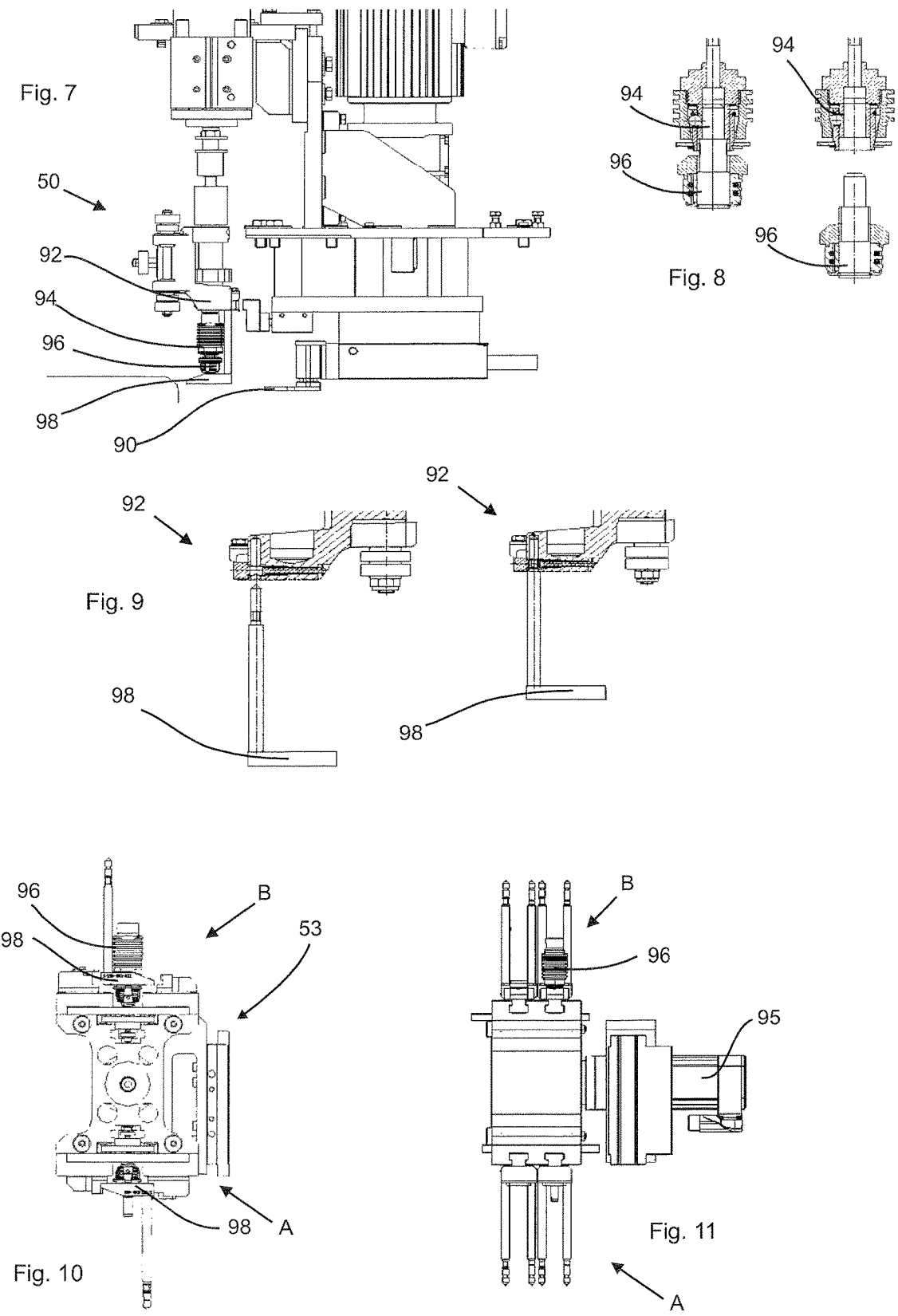

APPARATUS AND METHOD FOR RESHAPING PLASTIC PREFORMS INTO PLASTIC CONTAINERS WITH AN AUTOMATIC CHANGING DEVICE FOR HANDLING PARTS

BACKGROUND OF THE INVENTION

The present invention refers to an apparatus and a method for reshaping plastic preforms into plastic containers. Such apparatus and methods have long been known according to state-of-the-art technology. In this case usually what are known as plastic preforms are heated up before they are expanded into plastic containers in a heated state. This expansion is usually achieved by applying compressed air. The reshaping device usually features a plurality of blowing stations, wherein the individual blowing stations again have blow molds, within which the plastic preforms can be reshaped into plastic containers. Should a manufacturer wish to switch from one specific type of container to a different type of container, among other things the individual blow molds have to be exchanged.

Depending on certain reshaping processes, it is also necessary to replace certain handling parts for the heating device, such as holding mandrels for example, which hold the plastic preforms and shield panels or the like. Replacing these parts is a very complex process.

From the internal state-of-the-art of technology of the applicant it is therefore known to use changing robots for exchanging these handling parts. These changing robots can remove blow molds from their blow mold carriers and replace them with other blow molds. From the internal state-of-the-art of technology of the applicant, concepts for using several of these changing robots for exchanging handling parts with respect to the heating device or the oven respectively are also known. This procedure, however, is relatively expensive.

The purpose of the present invention is therefore to offer an apparatus and a method that is more efficient and especially more cost-effective than other state-of-the-art apparatus.

SUMMARY OF THE INVENTION

A plant for reshaping plastic preforms into plastic containers according to the present invention has a heating device for heating up the plastic preforms wherein this heating device has a transport device for transporting the plastic preforms with a multitude of holding elements for holding the plastic preforms.

Furthermore, the plant has an apparatus for reshaping the plastic preforms into the plastic containers that is arranged downstream of the heating device in a transport direction of the plastic preforms, wherein the apparatus has a transport device which transports the plastic preforms along a preset transport path and wherein the transport device has a movable station carrier, which is at least indirectly aligned with a base carrier and on which a multitude of reshaping stations is arranged, wherein these reshaping stations each have blow mold devices, which in turn form cavities, in which the plastic preforms can be reshaped or expanded into plastic containers. In this case these blow mold device are attached to blow mold carriers.

According to the present invention, the apparatus comprises a changing device which is suitable and intended for removing at least the blow mold devices from their blow mold carriers and/or attaching the blow mold devices to the blow mold carriers. In this case this changing device has at least one swiveling change arm, wherein this changing device is furthermore suitable and designed for removing at least one changeable element of the heating device from the heating device and/or attaching the changeable element to this heating device.

In contrast to plants that are known from the state-of-the-art it is therefore proposed, that the changing device or changing robot respectively is not only used for exchanging blow molds, but that the same changing device is also used for removing or changing elements from the heating device.

In other words, a robot, that is used for replacing blow molds, can also be used for the change of elements of the heating device, such as holding mandrels or heating mandrels respectively or shield panels in the heating module. This way, the existing changing device can remain in use and be better utilized. Furthermore, the operating personnel can be used more efficiently, as just one changing device can change all handling parts preferably completely by itself.

The heating device preferably has a locking device or locking elements respectively, which lock the exchangeable changing elements with respect to the heating device or a carrier respectively. In this case it is advantageous for this locking device to be designed in such a way that it can be released by the changing device independently and, if necessary, locked—automatically or independently. This way it is possible for the changing device to firstly release a lock of this manner and then the element to be exchanged can be inserted, preferably, in order to lock the locking mechanism again afterwards.

In other words, the heating device can have releasing mechanisms or locking mechanisms respectively that enable or prevent respectively a change of the respective handling part or element to be exchanged respectively.

In another advantageous embodiment, the change arm can be moved in a first changing position in which it can grip blow mold devices as well as in a second changing position in which it can grip at least one changeable element of the heating device. With this, it is proposed that the changing device has one change arm, that is guidable in a working area of the apparatus for reshaping the plastic preforms and can perform changing procedures in this area, as well as in a working area of the heating device to exchange the corresponding changing elements or handling parts respectively there.

In another advantageous embodiment, the changing device has at least one gripping device for gripping the blow mold devices. Gripping device means any device that can at least make non-positive contact with the blow mold device in order to remove it from a blowing station or from a blow mold carrier respectively or in order to attach it to a blowing station respectively. In this case this could be a gripping device in a more narrow definition, but it is also possible however for the gripping device to have engaging elements that interact with appropriately adapted engaging elements of the blow mold so that at least non-positive, but preferably positive engagement between the blow mold device and the gripping device is formed.

In another advantageous embodiment the gripping device is attached to the change arm in a changeable manner. This, for example, allows for a gripping device, which is used for gripping a blow mold device, to be exchanged with a gripping device, which is used for gripping a changing element of the heating device. It is particularly preferred that the changing device can exchange the respective gripping devices independently by itself. This way, a largely automatic changing operation regarding the apparatus for reshaping plastic preforms as well as regarding the heating device is possible.

In general, the gripping device is a handling device that however is in particular also suitable for transporting the respective part that is to be inserted, such as the blow mold, the holding mandrel or a shield panel. In another advantageous embodiment it could also be possible to attach two gripping devices to one arm of the changing device with one of these gripping elements being used for gripping the blow mold device and the other for gripping a changing element of the heating device.

With regard to a swivel or rotation axis, in this case these two gripping devices could for example be arranged on opposing sides. This way it is possible for the other gripping device to not interfere with the changing operation in progress, respectively.

In another advantageous embodiment, the changing device can be moved in its entirety with respect to the heating device and the apparatus for reshaping. The changing device could conceivably be guided along rails and therefore be moved between predetermined areas of the heating device and the reshaping device.

The changing device could however, for example, also be placed stationary between the heating device and the apparatus for reshaping and preferably operate both machine modules with its arm. With this arrangement, said arm is preferably equipped with a interchangeable head, i.e. with the gripping device, that allows it to change the respective gripping device and place it down independently. In this embodiment it would be possible to have a treatment head such as this for the apparatus for reshaping and a treatment head for the heating device.

There could also be combined treatment systems or treatment heads respectively that have—as mentioned previously—two different gripping types on one head, for example one for changing blow molds and one for changing heating mandrels. This has the advantage that the actual head on the robot arm would not have to be replaced.

In another embodiment it could be possible to arrange the changing device on a cart that can be moved freely so that it can not only be used for the apparatus as described here but also for further aggregates or devices respectively, such as a filling device, a labeling device or similar.

Arranging the changing device on a rail system as described above has the advantage that the changing device can be moved in defined areas via defined routes. Also because of this, a central area for stocking handling parts can be chosen. The changing device or the robot respectively in this case preferably always picks up the handling parts, which are needed for the respective changing procedure, onto its cart and buffers them preferably temporarily. One advantage of this is that magazines for the handling parts, that take up space on the machines and hinder access to the machines, are no longer necessary.

In another advantageous embodiment, the changing device is arranged in a save area such as a protective case. This way, injuries to the user caused by the changing device can be prevented. The arm of the changing device could for example be set or moved in such a way, that the entire changing device fits inside the case.

This case could be separate from the previously mentioned apparatus, but it could also be possible to have the changing device be arranged in an area of the whole apparatus for manufacturing containers that is intended for this purpose.

In another advantageous embodiment, the changeable element of the heating device is selected from a group of elements that comprises holding mandrels for holding the plastic preforms, holding brackets for holding the plastic preforms, shield elements for shielding off parts of the plastic preforms from heat and the like. These shield elements can, in particular, be what are known as shield panels that keep heat, that needs to be applied to the base body of the plastic preforms, away from the areas that are not to be heated up and especially the aperture area of the plastic preforms.

In another advantageous embodiment, the apparatus comprises at least one magazine device for storing blow mold devices and/or for storing changeable elements. This allows the changing device to remove blow molds and place it in said magazine independently by itself. The apparatus preferably has two magazines with one being intended for blow mold devices and the other for elements of the heating device such as previously mentioned holding mandrels.

In another advantageous embodiment, the plant has an additional treatment device for treating containers. The plant and/or the treatment device further has a changing device which is suitable and intended for changing at least one expendable material and/or at least one handling set of this further treatment device. In this embodiment, the invention is intended for a plant that has at least two treatment devices, such as two blowing machines, or also one blowing machine and a filler, or an oven as well as a blow mold device that is arranged downstream. It will be possible for several changing devices or robots to be used on the apparatus or one robot that carries out tasks on several treatment devices to be used. Here it is possible for these changing devices to communicate with one another in a complete line or plant respectively by means of a superordinated control. With this it is possible for the same changing device as described above to be used for carrying out processes on various plants and parts. Multiple changing devices can also be provided. As mentioned, these treatment devices can be two or more treatment devices of the same kind, such as two fillers or two blow mold machines or also various treatment devices.

It is pointed out, that the embodiment with an additional treatment device as described here can also be used independently from the invention as described above, i.e. changing blow mold parts in their blow mold carriers. The applicant reserves the right to claim individual protection for an embodiment of this type. This embodiment could conceivably also be used for plants which have no blow mold devices, for example plants which have a filler and a labeling device.

In another advantageous embodiment, the changing device which is suitable and intended for at least removing the blow mold devices from their blow mold carrier and/or attaching blow mold devices to the blow mold carriers, is also suitable and intended for changing at least one expendable material or at least one handling part of this further treatment device. As such, it is for example possible for one changing device to be mobile, particularly wheeled, in order for it to drive between various apparatus parts or treatment devices. Preferably, the plant or line or changing device respectively is arranged in such a way, that a changing device can reach the entire line or plant respectively. Here it is possible for the plant or changing device or changing devices respectively to be arranged in such a way, that a changing device can also reach multiple machine parts of the same type such as multiple blowing machines and carry out various tasks on them.

In another advantageous embodiment, the additional treatment device is selected from a group of treatment devices which includes manufacturing devices for manufacturing plastic preforms, filling devices for filling containers, labeling devices for labeling containers, grouping devices for creating container groups, packaging devices for packaging several containers, closing devices for closing containers, reshaping devices for reshaping plastic preforms to plastic containers, combinations thereof and the like. The respective changing devices carry out different tasks. It would for example be possible for a labeling machine to change labels, particularly when a labeling machine, that does not comprise a multitude of label rolls (multireel), is used. In the case of a labeling machine, screw changes could additionally be carried out in order to change the separation between consecutive containers in this way.

In the case of a packaging machine, rolls with packaging material could also be added. Additionally, a lane guide for guiding the containers could however also be changed.

In a palletizing system, new intermediate layers could, for example, be inserted or the functions turning and distributing could be carried out. In addition, two changing devices could be provided, so that one changing device could for example be removed in the case of a change of types.

When using a filling device, new handling parts, such as filling elements and the like, can also be inserted. In the case of a closing device for closing containers, closing cones and/or closures could, for example, be changed. If the treatment device is an injection molding machine, the injection molding tool could for example be changed.

In principle, the changing device could supply and dispose of packaging materials such as labels, preform closures and the like. In addition, palletizing during production could happen alongside a mold change in the case of a change of types in order to avoid the need for a palletizing robot.

Additionally, the changing device could also adjust the apparatus in the case of a mouth change by for example changing a blowing piston or holding mandrels in the case of a blow mold machine or also clamps, a saw tooth star or the like.

The changing device could also be used to support the user indirectly. As such, the changing device could for example drive through the plant with a user on board, in order for him to carry out tasks manually.

Additionally, the changing device could also be used for treating the product itself, particularly during a container inspection (and/or preform inspection) in order to achieve a treatment between individual test stations.

The changing device could also be used for carrying out quality inspections. Eventually, it would also be possible for user tasks such as maintenance, service, supply or disposal to be carried out by the changing device.

In another advantageous embodiment, at least one changing device is movable between at least two treatment devices. As such, a rail system could for example be provided, with which the respective changing device could be moved between the two treatment devices. This way, the changing device can carry out working operations on both treatment devices.

Additionally, a driverless transport system could also be provided, wherein the changing device can move between several treatment devices, for example by means of a rail system or a GPS guidance.

In another advantageous embodiment, the plant comprises a storage device for handling parts, so that certain handling parts and/or expendable materials can for example be stored and exchanged for other handling parts.

In another advantageous embodiment, at least one changing device is suitable and intended for removing handling parts and/or expendable materials from the storage device and/or adding handling parts to the storage device.

The present invention is furthermore targeted at a method for manufacturing plastic containers, wherein plastic preforms are heated up using a heating device and transported via a transport device while they are being heated up.

In this case this heating device or transport device respectively has a multitude of holding elements for holding the plastic preforms. After being heated up, the plastic preforms are expanded by means of an apparatus for reshaping (that is arranged downstream of the heating device) and shaped into the plastic containers. This apparatus for reshaping in this case has a transport device which transports the plastic preforms along a preset transport path and further the transport device has a movable station carrier, which is at least indirectly arranged on a stationary base carrier, and on which a multitude of reshaping stations is arranged, wherein these reshaping stations in each case have blow mold devices, which form cavities, in which the plastic preforms are shaped into plastic containers, and wherein these blow mold devices are each arranged on blow mold carriers.

According to the present invention, at least the blow mold devices are at least temporarily removed from their blow mold carriers and/or attached to the blow mold carriers using a changing device. Furthermore, this changing device removes at least one changeable element of the heating device at least temporarily from the heating device or attaches a changeable element to this heating device. This heating device is preferably an infrared oven, however, microwave ovens could conceivably be used as well.

In a preferred method an operating element of the changing device is at least temporarily moved into a working area of the heating device and an operating element of the changing device is at least temporarily moved into a working area of the apparatus for reshaping. This allows for the same operating element to be used for both purposes, i.e. for changing blow mold devices as well as for changing elements of the heating device.

This element could for example be the end section of a change arm but also the previously mentioned treatment head that has gripping elements attached to it. As mentioned above, the working area describes, in particular, a spatial area through which the respective element to be inserted can be moved, for example the position in which changeable elements such as this are usually changed. In the case of the heating device this can be for instance an redirection area, around which a chain with a multitude of holding elements is led.

In another advantageous embodiment, a lock between the heating device and a part to be changed is released by means of a releasing element preferably, in particular, by the changing device.

Such a lock between an inserted element and its carrier or a different area of the apparatus for reshaping and/or of the heating device can advantageously also be engaged by means of a locking device, particularly by the changing device.

In another preferred method, the parts to be replaced are stored in a magazine device. This can be a magazine device that allows for the individual changing elements to be stored separately.

Furthermore it could be possible to carry out cleaning procedures on the blow mold devices and/or the changing devices during the changing process. As such it could be possible for the changing device to also effect that cleaning and/or sterilizing agents are applied to the part to be changed. The element to be changed could for example be submerged in a bath with cleaning and/or sterilizing agent. It could also be possible to apply cleaning and/or sterilizing agents to the part to be changed by using a stressing device. This procedure can also lead to a fully automatic change of the respective parts.

Preferably, the changing device is also suitable and intended for carrying out a treatment process on at least one operating element intended for the apparatus in an additional operating mode that is different from the changing operation. The changing device could conceivably also be used for changing further parts, such as for instance stretching rods, transfer star wheels and the like.

It is therefore proposed to not only use the changing device for changing blow molds but also for carrying out other tasks at other times, such as cleaning or maintaining parts, such as blow molds. It is for example possible to have the changing device, that could in particular but not exclusively be a robot, carry out cleaning and maintenance operations to, for example, removed blow molds during the production of the containers.

This is particularly favorable when blow molds have to be changed frequently. As mentioned, the changing device is preferably a semi-automatic and preferably automatic robot. However, a manual changing device is also possible. It could for example be possible to use what is known as a manipulator instead of a robot. A manipulator compensates for the weight of a part to be moved, such as a blow mold, to facilitate the operation. The user can lead the manipulator that has a gripping element for molds attached at the end. A change with a manipulator such as this is not carried out automatically or without a user respectively. It is pointed out, that the design of the changing device as a manipulator can be used regardless of whether the changing device carries out additional tasks besides replacing parts.

The applicant therefore reserves the right to claim protection for the embodiment of a changing device as what is known as a manipulator or as a human-operated part. A manipulator such as this has lower manufacturing costs than a robot.

It is also pointed out, that the changing device can also be used for tasks that do not affect the reshaping device directly, such as cleaning procedures to the filling elements of a filler.

In addition, it is not necessary to section off an area to store this manipulator or robot. Additionally, the technology for a manipulator such as this is simpler and cheaper and is therefore for example suitable for countries with lower technological standards.

Nevertheless, a manipulator such as this also allows for the blow mold device to be replaced as a whole, i.e. in particular including all parts of the blow mold. With this a quick and ergonomic replacement process is also possible here.

Apart from that, however, other components of a changing device such as this, such as molds, the magazine, the blowing station and the actuator, can stay the same. A manipulator such as this has the advantage, that it can be realized at little cost and also be targeted, in particular, at customers who wish to change parts quickly without using an automatic changing device.

In order to fill a magazine with blow molds, the blow molds can for example be inserted into the respective openings as a package by an operator onetime. As such a mold package has preferably no handles or the like and the three parts (mold halves and base) are not fixed to each other, it is generally hard to realize this without appropriate tools. For this task, the operator can use a simple tool that emulates the gripping head of the robot in order to grip the mold package. A secure grip is ensured by non-positive and positive connection.

In another advantageous embodiment, the changing device therefore has a gripping device for gripping the blow mold devices, wherein this gripping device can be moved in at least two different directions. This gripping device advantageously can be swiveled around at least three different axes. Preferably it can be swiveled around six axes.

Preferably the gripping device is attached to a moveable arm. It is particularly preferred, that the gripping device can be automatically separated from this arm. In addition it is in this case also possible to automatically disconnect media connections.

With the invention it is possible to have the changing device carry out tasks that are necessary for the next replacement procedure, such as cleaning blow molds or loading the magazine, while it is in a certain operating mode and especially during the production of the blowing machine.

In another advantageous embodiment, the changing device has at least one treatment device for treating the operating element. This can for example be a cleaning element that is meant for cleaning said operating element. This cleaning element can for example have a nozzle for applying a cleaning or sterilizing medium on to the surface of the operating element. In addition to that, the treatment device can also have a sterilizing device, e.g. a stressing device, that applies a sterilizing medium to the operating element or a radiation device that subjects the operating element to radiation for the purpose of sterilizing it.

Therefore, the above mentioned operating mode is preferably a production mode of the apparatus. With this, it is proposed that the changing device carries out other tasks while the plant is in operation, i.e. when containers are being produced.

In another advantageous embodiment, the treatment procedure is selected from a group of treatment procedures that includes cleaning procedures, maintenance procedures, sterilization procedures, combinations of said procedures and the like.

In another advantageous embodiment, the operating element is selected from a group of operating elements that includes blow molds, gripping elements, holding mandrels for holding the containers, stretching rods, blowing nozzles, filling valves and the like. In another preferred embodiment, said operating element is also used for treating the containers. Therefore, it can be one of the above mentioned operating elements, which for example either grips the container or treats it in a different way, such as filling it, stretching it in its longitudinal direction (stretching rod) or the like.

In another advantageous embodiment, the treatment device can be exchanged for the gripping device. This means, that the gripping device as well as the treatment device can be arranged on the same arm. This allows for the gripping device to be exchanged for the treatment device or vice versa in order to carry out the corresponding procedures. In other words it is possible to exchange a mold gripper on a robot arm for a treatment device. It would, however, also be possible to arrange a mold gripper as well as a treatment device on the robot arm, and that they can, for example, be exchanged for each other with a specific motion. For example, it is possible that the changing device puts down a gripping device and attaches an operating device to the corresponding interface—preferably independently—in order to carry out this task.

Preferably, cleaning of the blow mold devices is carried out by the changing device.

In another preferred embodiment, the changing device places the molds into a cleaning device in an assembled state in order for them to be cleaned.

In another advantageous embodiment, a corresponding cleaning device disassembles the assembled blow mold devices to allow for all-round cleaning.

In another advantageous embodiment it is also possible that the gripping device is connected to the changing device or the robot respectively mechanically and, in particular, without the user having to interfere (preferably this is a positive connection). Advantageously the connection is of the type, that media, such as pressurized air and control signals, can also be attached at the same time.

Furthermore, it is possible to use a handling tool that is based on the principle of a gripper with a smooth surface for manually loading and unloading blow mold devices onto and from the magazine.

In another advantageous embodiment it is also possible for the changing device to have elements, which attach or remove media, which are necessary for tempering the blow mold devices, when inserting a blow mold and preferably also when removing a blow mold device. Preferably, this is done automatically.

In doing so, it is possible for the changing device to change a gripping head when attaching or removing these media.

In another advantageous embodiment it would also be possible for media to be attached or removed during the inserting motion of the blow mold device by the changing device into the blow mold carrier.

Such couplings are preferably arranged in such a way, that the motion for inserting as well as attaching or removing is essentially parallel to a stretching rod of the apparatus. This makes attaching and removing procedures easier.

In another advantageous embodiment, the apparatus comprises an operating device for operating the changing device. This operating device advantageously also has a touch screen and preferably a robot controller. Preferably, these devices can be used by multiple machines and they are preferably connected with one another through a standardized interface.

In another advantageous embodiment, the gripping device is arranged on an arm that can be swiveled around at least one given swivel axis. This increases the maneuverability of the gripping device.

In another advantageous embodiment, the apparatus comprises a case that surrounds at least the station carrier and also the blow mold device at least partially. The changing device is preferably arranged outside this case. In particular, this case has the purpose of protecting the user. In order for the changing device to be able to also carry out other tasks in operation mode, it is preferably arranged outside of the case. The changing device is preferably equipped with opening and closing devices that can open the case, especially to exchange blow molds after operation. With this, it is possible for the changing device to open and close the machine protection of the blowing machine, in particular, for changing molds. The protective area preferably comprises an opening element, which the gripping device of the changing device can grip in order to open and close the protective area.

The gripping device could, for example, grip a counterpart that is attached to a door of the protective area.

In another advantageous embodiment, the apparatus also has a protective area for the changing device. This protective area can at least partially surround the changing device while blow molds are being changed and it can also surround the changing device at least temporarily when no parts are being changed.

Furthermore, the present invention is targeted at a method for operating a reshaping device for reshaping plastic preforms into plastic containers, wherein in an operating mode of the apparatus the plastic preforms are transported along a predefined transport path by a multitude of reshaping stations and expanded into the plastic containers by applying a fluid and, particularly, gaseous medium. For the expansion of the plastic preforms, blow mold devices are used, inside of which the plastic preforms are expanded into the plastic containers. While parts are being changed in the apparatus, at least one of the blow mold devices is removed from the apparatus and/or one of the blow mold devices is attached to a blow mold carrier of the apparatus.

Favorably, a changing device with a gripping device for gripping the blow mold devices is used for changing the blow mold devices, wherein this changing device carries out an additional treatment device in an additional operating mode. Favorably, plastic preforms are also expanded into plastic containers in this additional operating mode of the apparatus.

In addition or alternatively, it would also be possible for the changing device to be a manual changing device, particularly a manipulator. By using a manipulator such as this, the user can, as mentioned above, also carry out changing procedures manually, and he will have to use much less energy than for a purely manual changing procedure.

In another advantageous embodiment, the changing device is equipped in the above mentioned way, wherein for example a gripping device of the changing device is preferably swapped in temporarily by a treatment device for carrying out treatments. Favorably, this is also done automatically.

As mentioned above, this treatment process is preferably a cleaning and/or sterilization process. With this it is possible, as mentioned above, to not only treat a blow mold device, but also other elements, such as stretching rods, blowing nozzles, filling devices and the like.

In another advantageous embodiment, the gripping device is arranged on an arm that can be swiveled around a predefined first swivel axis. Due to its arrangement in the changing device, this arm will hereafter be referred to as second arm. In this case, the gripping device can itself be arranged on this arm in such a way, that it can be swiveled or rotated.

In another advantageous embodiment, the (second) pivotable arm is arranged on a further arm that can be swiveled around a predefined second swivel axis. Due to its arrangement in the changing device, this additional arm will hereafter be referred to as first arm. Favorably, the first swivel axis is not parallel to the second swivel axis and it is particularly preferred that it is skew in the mathematical sense. With these two axes, two degrees of freedom of movement of the gripping device can be achieved. The gripping device is favorably arranged on the second arm, so that it can be swiveled. With this pivotable arrangement, another degree of freedom of movement is possible. The gripping device can favorably be swiveled around two axes in relation to the second arm, for example one axis in the direction of this arm and one axis vertical to this.

With this, the gripping device is favorably arranged on the first arm so that it can be swiveled around at least two axes which are vertical to one another.

The gripping device is preferably arranged in such a way, that it can be swiveled around at least four axes, preferably be swiveled around at least five swivel axes and preferably be swiveled around at least six swivel axes.

Preferably, at least one of these geometrical swivel axes is stationary. Preferably, this stationary swivel axis is arranged vertically. Preferably, at least one axis is always, i.e. independent of a position of the changing device and/or the gripping device, arranged on a spatially-fixed plane. This spatially-fixed plane is preferably a horizontal plane. Preferably, at least two axes are always, i.e. independent of a position of the changing device and/or the gripping device, arranged on a spatially-fixed plane.

Preferably, at least one pair of axes, that are always, i.e. independent of a position of the changing device and/or the gripping device, vertical to one another, is present. Regarding these two swivel axes, the first arm can preferably be moved with respect to a (stationary) carrier.

Preferably, at least another pair of axes, that are always, i.e. independent of a position of the changing device and/or the gripping device, vertical to one another, is present. Regarding these two swivel axes, the second arm can preferably be moved with respect to the first arm.

Preferably, at least another pair of axes, that are always, i.e. independent of a position of the changing device and/or the gripping device, vertical to one another, is present. Regarding these two swivel axes, the gripping device can preferably be moved with respect to the second arm.

The arrangement of the (geometrical) swivel axes as described here is especially suitable for offering great freedom of movement of the gripping device.

Preferably, at least two swivel axes are always, i.e. independent of a position of the changing device and/or the gripping device, arranged parallel to each other.

In another advantageous embodiment, the gripping device has engaging means in order to grip at least one protrusion arranged on a blow mold device. Preferably, the gripping device has two engaging means in order to grip two protrusions arranged on a blow mold device. In this case such a protrusion can be arranged on two blow mold parts in each case and the gripping device can engage behind it during transport, in order to hold the blow mold device together in its entirety.

In another advantageous embodiment, the second arm can be swiveled around at least two swivel axes relative to the first arm. Preferably, these swivel axes are vertical to each other.

In another advantageous embodiment, the gripping device can have a positive and/or nonpositive connection with the blow mold device. This allows for the changing device to safely grip and transport the blow mold devices, wherein transport at higher speeds is also possible.

In another advantageous embodiment, the gripping device has a passive gripping element. This means in particular, that the blow mold devices are not held because of an active gripping motion of the gripping element, e.g. a clamping motion, but merely by correct positioning of the gripping element or the gripping device respectively relative to the blow mold devices to be transported. This way, an element of the gripping device in particular can engage behind a section of the blow mold device.

In addition, it is also possible for the gripping device to have a magnetic or magnetizable element for holding the blow mold devices. The gripping device could for example have an electromagnet, that can be activated as soon as the gripping device is in a predefined position with respect to the blow mold device. The gripping device could also allow to cause the parts of the blow mold device to be held together magnetically.

In another advantageous embodiment, the changing device has a control device, which removes the blow mold device from the blow mold carriers and/or attaches the blow mold device to the blow mold carriers force and position controlled. Detection devices that detect motion, particularly of the gripping device, as well as detection devices for the measurement of forces may be provided.

With this control, it is also possible to define one or several reference points on the blow station and/or the magazine which can be arrived. This way, it is possible to determine the exact geometrical position of the blow mold device at any point during the transport. Furthermore, the gripping device can preferably be deflected in several degrees of freedom, for example in the direction of the x-, y- and z-axis, especially to correct inaccurate positioning. It would, however, also be possible to electromechanically block one or several of these degrees of freedom. This way, faster operation of the apparatus can be achieved.

Favorably, a detection device is provided, which can detect the position or a displacement respectively with respect to these degrees of freedom, preferably by for example electrically querying these.

In another advantageous embodiment, the gripping device has active elements, which create a positive and non-positive connection with the blow mold device. In this case, it is possible for the gripping device to create a positive connection between the two side parts of the blow mold device and also preferably a non-positive connection between said halves of the blow mold and the base mold is created. This second connection with the base mold can be achieved through appropriate engaging elements of the side parts and/or the base mold.

In another advantageous embodiment, the apparatus, in particular the gripping device, has centering elements to allow for the gripping device to be correctly positioned on the blow mold device or the reshaping station respectively. These centering elements can be equipped with lead-in bevels, for example conical lead-in chamfers, with which the gripping device engages to corresponding elements at the reshaping station during the change procedure or makes contact these corresponding elements. Favorably, these corresponding elements are arranged on a mold carrier holder. This way, the gripping device can be positioned with respect to the blow mold device that is to be transported.

Furthermore, the present invention is targeted at a method for operating a reshaping device for reshaping plastic preforms into plastic containers. In an operating mode of the apparatus, the plastic preforms are transported along a predefined transport path by a multitude of reshaping stations and expanded into the plastic containers by applying a fluid and, particularly, gaseous medium. For the expansion of the plastic preforms, blow mold devices are used, inside of which the plastic preforms are expanded into the plastic containers. While parts are being changed, at least one of the blow mold devices of the apparatus is removed and/or one of the blow mold devices is attached to a blow mold carrier of the apparatus.

According to the invention, a preferably automatically operating changing device is used for changing the blow mold devices, which has a gripping device for gripping the blow mold devices, wherein this gripping device can be moved in at least two different directions. Preferably, the gripping device can be swiveled in relation to at least three, preferably at least four swivel axes.

Preferably, a changing device as described is used.

Preferably, this changing device has at least one swivelable change arm and is arranged on the base carrier at least indirectly. It is therefore proposed, that a changing device, particularly in the form of a change robot, is arranged directly in the area of the apparatus for reshaping. Favorably, this apparatus therefore has a base carrier, such as a machine frame, on which the station carrier is also arranged. The change robot is also arranged on this base carrier, so that it can be integrated into the machine completely.

An essentially indirect arrangement means, that the changing device can be arranged on the base carrier directly, but it is also conceivable that the changing device is arranged on an additional element, for example a subcarrier that, in turn, is arranged on the base carrier.

With this, an integration of the changing device or the robot respectively in the machine is proposed. Preferably, the blow mold device is formed in multiple parts and comprises at least two side parts and a base part. During operation, these three parts form said cavity for expanding the plastic preforms. Favorably, at least two parts and especially preferably all three parts of this blow mold device can be locked together, so that the blow mold can be removed from the machine or the blow mold carrier respectively in its entirety. The blow mold carrier is therefore suited for housing various blow mold devices. It could also be possible for the blow mold device itself to be arranged on the blow mold carrier with carrier shells.

Favorably, the blow mold carriers can be moved and especially swiveled in relation to one another. In this case in an operating mode, the blow mold carriers can be swiveled apart around a predefined swivel angle in order to bring in plastic preforms and/or to remove manufactured containers. Larger opening angles are preferably possible for when parts are being changed.

In another advantageous embodiment, the reshaping stations each have stretching rods, that can be inserted into the plastic preforms during operation, in order to stretch them in their longitudinal direction. Favorably, the individual reshaping devices also have stressing devices which particularly have blowing nozzles, which apply a fluid and, in particular, gaseous medium to the plastic preforms during operation. In this case it would be possible for other parts of the reshaping stations to be replaced, such as, in particular, said stressing device or blowing nozzles respectively and/or the stretching rods.

Favorably, the station carrier is a rotatable carrier, such as a blowing wheel, in particular. The individual reshaping stations are preferably arranged on an external circumference of these rotatable carriers. With this, the reshaping stations are moved along a circular path during operation.

The apparatus favorably has a drive unit for moving the station carrier and this drive unit preferably allows for a continual motion of the station carrier as well as a clocked motion of the station carrier, which has rest periods between the motions respectively. Favorably, this type of motion can be adjusted in relation to an operating mode. In an operating mode, the station carrier is preferably moved continually, when parts are being changed it is preferably moved clocked. In this case the motion of this station carrier can also be coordinated with the motions of the changing device. Favorably, the station carrier is a blowing wheel.

This approach according to the invention allows for a fully automatic change of parts, in particular by using an industrial robot. The blow mold device, particularly when parts are being changed, can favorably be locked fully automatically, or rather the individual elements of the blow mold device can be fixed to each other respectively. The changing device is therefore preferably suited for gripping or removing respectively the entire blow mold device, i.e. all of the at least three parts together. A corresponding mold lock can be deactivated favorably after gripping the blow mold device. In a further step, the changing device can set the mold compound down in a storage device, such as a magazine. The changing device can then insert a new mold compound or a new blow mold device respectively into a blow mold carrier and (preferably) lock the new blow mold device together with the blow mold carrier.

The station carrier can then be moved to the next position, in order to change another blow mold device. With this, a fully automatic process, where no user is necessary, can be carried out.

In another advantageous embodiment, the apparatus has a case, which surrounds at least the station carrier in its peripheral direction. Principally, the entire blow mold device and/or the changing device can be arranged inside the case, wherein the case also has a protective function.

The changing device is preferably integrated into the machine directly and can for example be mounted on a base frame. In another advantageous embodiment, the changing device can be moved as a whole into a space that is surrounded by the case. In this case it is possible for the changing device to be integrated completely into the machine during an operating mode, so that it is not even visible from the outside and in particular does not interfere with the operation of the reshaping device. It is possible for the cladding of the case to also act as protection for the changing device or the robot respectively. Said changing device is preferably arranged inside of the case during operating mode.

In another advantageous embodiment, the changing device has a first control device for controlling the motion of removing the blow mold devices and/or the motion for inserting or attaching respectively the blow mold devices to the blow mold carriers and the apparatus preferably also has a second control device for controlling a blow mold process, wherein the first control device and the second control device interact at least partially and/or at least temporarily. These two control devices particularly interact when blow molds are being changed. Thus, the same motions that are necessary in the operating mode can also be used for changing parts. These include the transport motion for the reshaping stations, opening and closing the blow mold carrier and the like.

When changing parts, the blow mold carriers can also be opened in order to remove a blow mold device. The second control device can for example cause the blow mold carrier to open, and this in turn can cause the first control device to remove the blow mold devices. This also makes a fully automatic change of the blow molds possible. Thus, the control for the changing device preferably interacts with the control device for the reshaping machine or blowing machine respectively.

In another preferred model, the changing device has a first control device for controlling the motion of removing the blow mold devices and/or the attaching motion for attaching the blow mold units to the blow mold carriers and the apparatus also has a second control device for controlling the blowing process, wherein one control device is integrated into the other control device.

The controls for the changing device, in particular, are integrated into the controls for the device or blowing machine respectively. It is possible for the changing device to be a module that can be integrated in a control-technical manner in the blow mold machine, for example after plugging them together or connecting their controls. It would also be possible to upgrade an changing device at an existing apparatus. These control devices can be designed in such a way, that a protective area is increased when parts are being changed. During an operating mode, the changing device can be in a rest position in which it does not pose a danger and in which it does not hinder the operation of the machine.

When parts are being changed, the changing device also becomes active, so that the areas, that could become dangerous for persons entering it, have to be widened. As such it is conceivable, that protective areas, that have been changed while parts are being changed, are also closed or at least identified to the user.

It would also be possible to actuate additional protective elements when parts are being changed, in order to increase the safety of the user.

In another advantageous embodiment, the changing device has at least one gripping device for gripping the blow mold devices. This can be a gripping device that grips the blow mold device in its entirety. It would be possible for media necessary for the gripping device and/or electrical signals to be guided by areas of the changing device, such as axes or swivel arms. For example, it would also be possible for such connections to be guided through rotary transfer joints, for example along the axes of the changing devices.

In another advantageous embodiment, the changing device has at least one detection device for detecting at least one force acting on an element of the changing device. Particularly external forces can affect, for example, a change arm which removes the blow mold devices. The above mentioned control device, in particular, can be designed in such a way that it can react to external forces by, for example, the changing device deviating from a nominal position (softfloat) during defined operations such as placing down or picking up a blow mold device. In general it is a detection device which can react to physical impact or suchlike, such as a torque, forces, impulses or the like. This way, the changing device can react quickly.

However, the changing device preferably stays within a limited working area. This means, that the motions for removing and inserting the blow mold devices, in particular, also take place inside a limited working area. When reacting to the above mentioned external forces, a position can deviate from this working area. Otherwise, this defined working area is preferably adhered to, especially when molds are being changed.

Favorably, it is possible for the working area of the changing device to be limited mechanically, in particular, and regarding the safety. This limitation of the working area can be achieved in various ways, for example with light barriers, which detect movements of the changing device that are either incorrect or go too far and then cause the changing device to return or to come to an emergency stop. Besides that, it would also be possible to limit the working area with mechanical elements, such as stoppers.

Preferably, it is also possible for a working area of the changing device to be checked regarding its safety, electrical equipment or also its controls. It is, in particular, possible to deviate from a largest possible working area and (further) limit this working area.

In another advantageous embodiment, the changing device comprises serial and/or parallel kinematics with at least three axes of motion. The changing device preferably has serial and/or parallel kinematics with more than three axes of motion. This way, the changing device or a gripping element of the changing device can achieve great freedom of movement. The blow mold devices can thus also be removed from or attached to their blow mold carrier depending on the actual conditions in various ways.

It is possible for the apparatus to have an operating device for controlling the changing device or the gripping arm respectively. This can, for example, be a manual operating unit. It would, however, also be possible to control the changing device with the help of devices such as, for example, smartphones.

A control with operating units such as these is especially favorable in setup mode, i.e. when inserting new blow mold devices.

Furthermore, the present invention is targeted at a method for operating a reshaping device for reshaping plastic preforms into plastic containers. Here, the plastic preforms are transported along a predefined transport path by a multitude of reshaping stations and expanded into the plastic containers by applying a fluid and, particularly, gaseous medium. For the expansion of the plastic preforms, blow mold devices are used, inside of which the plastic preforms are expanded into the plastic containers. While parts are being changed, at least one of the blow mold devices of the apparatus is removed and/or one of the blow mold devices is attached to a blow mold carrier of the apparatus.

A changing device that is arranged on the apparatus is favorably used for changing the blow mold devices. Regarding the method it is thus also proposed, that blow molds are changed by using a change robot which is arranged on the apparatus or integrated into the apparatus.

In another preferred method, the reshaping devices are transported along a circulating transport path during the operating mode and when parts are being changed the blow mold devices are removed in a predetermined position of the respective reshaping station (from which the blow mold device is to be removed) with respect to the circulating transport path. It is thus proposed that the reshaping stations circulate during operating mode as it is known from state-of-the-art. For the individual change of a part it is however proposed, that it at least takes place in an exactly determined station, that is particularly also inside of a radius of action of the changing device. In other words, the position for removing on a blowing wheel is favorably always identical. During production or working mode, it is possible for the changing device to align itself in such a way, that it can be arranged inside a protective area of the blowing machine or of a case respectively.

The control device could conceivably control the motion sequence of the changing device or robot respectively via two independent coordinate systems. A coordinate system is favorably located on the position for removing or inserting respectively the blow mold device from and to the reshaping station or the blow mold carriers respectively. An additional coordinate system can be located in the area of a receiving device or magazine respectively, in which the blow mold devices are put down.

It is, however, possible for the positions of the receiving places of the blow mold devices on the receiving device or magazine respectively to remain unchanged relative to its coordinate system independent of the receiving device and/or the positions of the receiving places to be at equal distances from this coordinate system. A display device, particularly an input screen of the changing device, can be provided. By using these certain values of the coordinate systems, particularly the x-, y- and z-values of the coordinate systems can be changed. In addition, an additional input device, such as an input screen, can be arranged on the changing device and preferably interact with an input device of the blow mold machine.

It is possible for the blow mold devices to be removed and inserted in various ways.

Firstly, all blow mold devices could conceivably be removed from the individual mold carriers, i.e. the individual reshaping stations, and placed in an empty magazine or storage system respectively. This storage system with the old molds is then replaced with a full storage system with new blow mold devices that are to be inserted. All new molds are then inserted into the blow mold carriers. The storage system can, for example, be swapped by using lift trucks or rotary tables, similar to how palettes of machine tools are changed. In this case, the blow mold carrier will favorably perform two full rotations for a complete replacement.

In another possible process for changing parts, a magazine contains an empty spot. Firstly, a new mold is removed from a mold position and placed into this empty spot. An old mold is then removed from the mold carrier and placed in said mold position. In a further step, a new mold is taken from the magazine and inserted into the mold carrier. A second new mold is then placed in the empty spot and so on, until the entire change is complete. By storing molds temporarily in an empty spot it is guaranteed, that a given blow mold device is delivered to a given storage position or given blow mold carrier respectively. Said empty spot is favorably located between the blow mold carrier and the storage system and preferably on or in the storage system itself respectively.

Removing the blow mold device and/or inserting blow mold devices favorably takes place in a cycle mode. This means, that individual blow mold devices are replaced while the reshaping station is idle. The changing device can place a given blow mold device in a magazine, while the reshaping device itself can move to the next station, i.e. the blowing wheel turns to the next position. Blow mold devices are favorably removed and inserted in radial direction relative to the transport path. As mentioned above, it is also possible to park the blow mold device in an intermediate station. For this, a vertical motion can favorably be used.

Regarding the method it is possible for the gripping device of the changing device to positively grip the blow mold device in order to transport it or remove it from the apparatus respectively. The gripping device of the changing device favorably engages the blow mold device non-positively.

In another advantageous embodiment, removing and/or putting down the blow mold devices is position and/or force controlled and preferably position and force controlled.

As part of the controls it is possible for the changing device to at least go to a defined reference point of the reshaping device or receiving position or blow mold carrier and/or preferably at least go to a defined reference point on a storage location, such as a magazine. This way, said points can be transferred to the controls of the changing device, whereby the exact positions of the form reception or the blow mold carriers and also of the magazine or the storage device respectively can be determined. Preferably, it is possible for these reference points to be arrived on every time a magazine device has been replaced or also in the case of faults, such as voltage breakdowns, in order for them to be transferred to the controls.

It is possible for the reference points, which have been determined in this way, to be saved and/or compared with reference points which are saved in the controls or a control device. If there is a discrepancy between the determined reference point and the previously saved reference point, which especially exceeds a predetermined value, an error message or alert can be created.

In another advantageous embodiment, the changing device comprises a device for recording pictures, such as a camera or the like. With this camera device, it is possible to record the exact locations for receiving or placing down the blow mold devices.

In this context it could be possible for the blow mold devices and/or the blow mold carrier and/or the magazine device to each receive a tag, in order to ensure the assignment between the blow mold devices and the individual blowing station. This way it is ensured that a given blow mold device which has been removed from a given reshaping station is assigned to the same reshaping station when they are being changed again. It would be possible for every storage magazine to have a single tag.

These tags can, for example, be bar codes, QR codes, RFID tags or the like. It is favorably possible for this tag to be queried contact-free. The tag or a value that is characteristic for this tag is favorably sent to the control device of the machine.

In another method, the individual tags can conceivably be imported anew every time the magazine device is changed or after a machine failure. This way, secure assignment can also be guaranteed under exceptional circumstances.

A receiving device or magazine respectively for the blow mold devices is described hereafter. This receiving device can be arranged in a suitable position for a change of the mold, e.g. next to the reshaping device. The magazine or receiving device can comprise insertion areas in which the blow mold devices can be placed into the magazine or receiving device respectively. These insertion areas can be conical, as to ensure a safe insertion of the blow mold devices. Essentially, the blow mold device or mold package respectively is favorably inserted into the magazine vertically. The blow mold device can particularly favorably be placed down in cylindrical openings of the magazine or receiving device. The magazine itself can be arranged on this receiving device—especially with a positive connection.

In a preferred embodiment, this magazine device can have elastic elements for inserting the blow mold devices, particularly around the cylindrical openings, in order to compensate tolerances.

In another advantageous embodiment it would also be possible for the magazine or storage device and/or the blow mold device to be equipped with insertion areas, and in particular tapered insertion areas, where the blow mold device makes contact with the cylindrical openings of the magazine device.

In another advantageous embodiment, the magazine or receiving device respectively has a multitude of openings for receiving the individual blow mold devices, as mentioned above. These openings are favorably cylindrical. Particularly favorably, these openings in the magazine devices are at least in sections made of plastic.

It is possible for these openings to be arranged in several rows with for example two adjacent rows facing one another and being offset to each other. This increases the packing density of the gripping device.

In another advantageous embodiment, the position of the blow mold device in the receiving device is lower than the position of the blow mold device in the blow mold carrier. This way, the blow mold device is lowered when it is disassembled.

In another advantageous embodiment, the magazine has a polygonal and favorably rectangular outer contour, wherein the long side of this outer contour is preferably arranged essentially vertical to an imaginary radial connecting line between a center of a pitch circle and the blow mold carriers. This way, the magazine device can be easily reached by the changing device or an arm of the changing device.

The arrangement of the blow mold device is described hereafter. For releasing the blow mold devices on a mold carrier or a mold carrier shell or for releasing a base of the blow mold device, the arrangement, i.e. particularly the side parts and the base, can be linked together mechanically. However, a magnetic connection is also possible.

A fixing mechanism, such as which interconnects the individual blow mold parts, is favorably designed in such a way, that it only shows or exerts one force in a pulling direction and that it has a certain give radial to the pulling direction in order to compensate tolerances. The parts of the blow mold device, such as the blow mold halves, can favorably comprise a protrusion, a cam or the like, where an element of the gripping device can engage behind or enter.

In another advantageous embodiment, the protrusions or cams that are connected to a gripping device are favorably arranged radial in the pitch circle of a center of a container. This way, it is possible for these cams to not come in contact with clamps, for example of an infeed or discharge starwheel, even in operating mode.

In another advantageous embodiment it would also be possible for the two mold shells and a base mold of the blow mold device to be connected positively which prevents the base mold from twisting relative to the side parts or mold shells. Aside from that, it would also be possible for the base mold to be connected mechanically to the mold halves before parts are to be changed.

In order to make the process of loading and unloading easier it would be possible for a rotational axis of the blow mold device to essentially run parallel to the axis of the mold carrier or also to a rotation axis of the blowing wheel when loading or unloading (the plastic containers).

In another advantageous embodiment it would also be possible for a protective area of the blowing machine to be automatically separated from a storage area of the blow molds or blow mold device during production. A separation of this kind can be carried out automatically at the start of a process of replacing molds.

The protective areas can be changed in such a way, that a user of the machine can enter the apparatus during production or an area of the mold storage in operating mode. For example, it would be possible for an electromechanical unit to ensure the position of a reshaping station relative to the changing device after positioning of the blowing wheel, favorably with a positive and/or non-positive connection.

Furthermore it would also be possible for the robot to remove the blow mold devices or the mold package respectively from an intermediate position and place it in the magazine, while the blowing wheel moves to the next position or brings a subsequent reshaping station into a changing position. Aside from that, the process of changing blow mold devices could generally include going to an intermediate station, in which the blow mold devices are parked or placed down respectively temporarily. In this case, the holding device need not be designed as a double gripper and it is still possible for the molds to be assigned to the appropriate station in a storage device such as a magazine.

As described above, the opening motion of the blow mold carrier and the base in a position for changing the blow mold device favorably deviates from the one during operation. This can, for example, be an advantage when the triggering of the mold carriers is not linked. It would also be possible for a trailing or leading blow mold carrier of the neighboring station in the position for replacing blow mold devices to also be swiveled away area by area, in order to increase the opening angle for the reshaping station in the changing position.

Furthermore, it would be possible for a fixing mechanism for the mold shells and the base molds to have a progressive characteristic line during a tightening process. At the start of such a tightening process, a large stroke can be carried out with moderate force, in order to bridge as great a distance as possible when pulling in. Towards the end of the tightening process, a large force is preferably carried out at a moderate stroke.

In another advantageous method, the changing position of the blowing station and/or the magazine and/or any intermediate position, in which the blow mold device are positioned temporarily, is in a preset circumference range of an action circle of the changing device, preferably in an area of 270° of the action circle, preferably in an area of 220° of the action circle and particularly preferred in an area of 180° of the action circle.

In another advantageous method, the changing device or the change robot respectively carries out a radial motion relative to the pitch circle of the apparatus when removing and/or attaching the blow mold device to and from the stations or the blow mold carriers respectively. This motion can be purely radial, but it would also be possible for the motion to be one with a radial component.

In another advantageous method, the changing device or the change robot respectively essentially carries out a vertical motion when removing and/or attaching the blow mold device to and from the stations or the blow mold carriers respectively. Essentially means, that the direction of motion does not deviate by more than 20°, preferably by more than 10° and particularly preferred by more than 5°, from the exactly vertical direction.

BRIEF DESCRIPTION OF THE DRAWINGS

Further advantages and embodiments are shown in the attached drawings:

In these views:

FIG. 7 a detailed view of a heating device for heating the plastic preforms;

FIG. 8 two presentations for replacing heating mandrels;

FIG. 9 two presentations for replacing shielding elements;

FIG. 10 a presentation of a gripping device;

FIG. 11 the gripping device from FIG. 10 with an additional perspective;

DETAILED DESCRIPTION OF THE INVENTION

Figure 1:
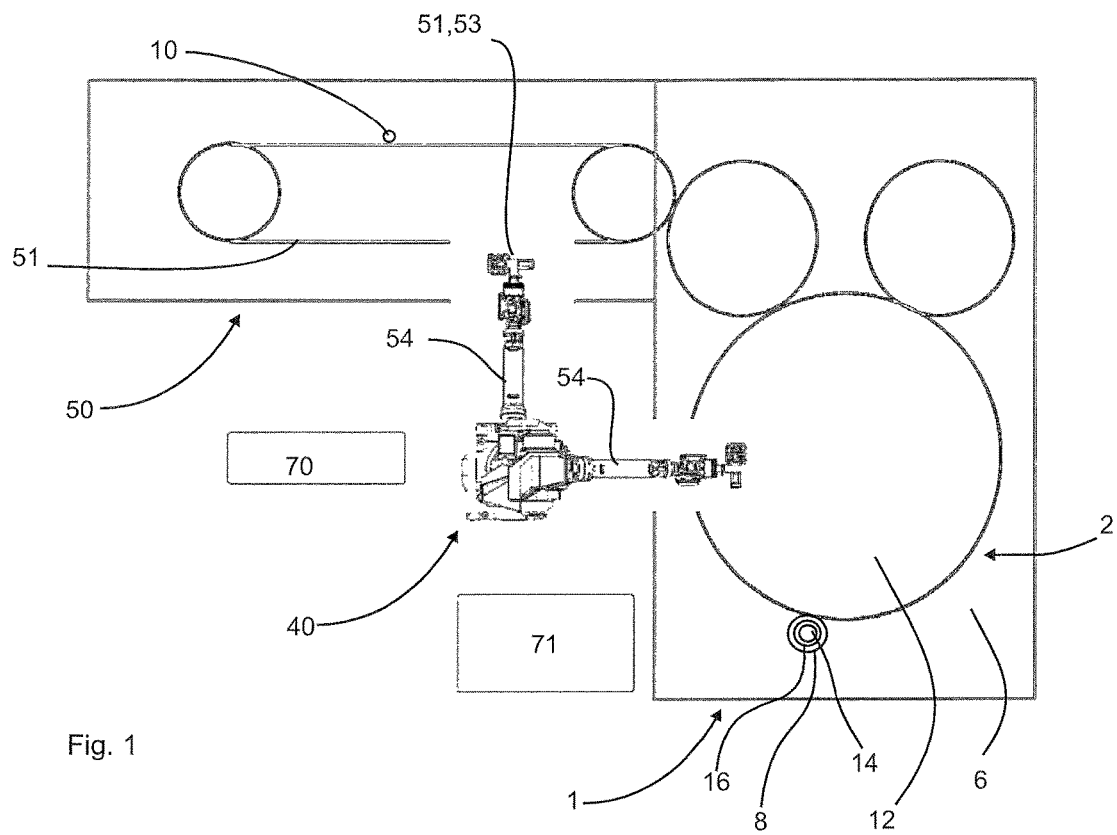
FIG. 1 a schematic presentation of a system for the production of beverage containers.

FIG. 1 shows a presentation of a plant 100 for the production of plastic containers according to the invention. This plant has a heating device 50, which in turn has a transport device 49 for transporting the plastic preforms 10. This transport device can be a circulating transport chain, on which a multitude of holding elements for holding the plastic preforms, such as holding mandrels (not pictured), are arranged.

Reference 1 marks a reshaping device for reshaping the plastic preforms into the plastic containers. In particular, this reshaping device is what is known as a stretch blow molding machine. In this respect, this reshaping device preferably also has a stressing device for applying a gaseous medium and in particular blow air to the plastic preforms.

Furthermore, the apparatus preferably has a stretching rod for stretching the plastic preforms in their longitudinal direction.

Reference 2 refers to a transport device for transporting the plastic preforms. This transport device has a station carrier 12, on which a multitude of reshaping stations 8 are arranged. This station carrier is here what is known as a blowing wheel, on which the individual reshaping stations 8 are arranged, particularly on its outer circumference. The individual reshaping stations 8 each comprise blow mold carriers 16, on which in turn blow mold devices 14 are arranged (only shown schematically).

Reference 40 marks a changing device which is used for changing the blow mold devices 14. This changing device 40 has a change arm 54 here which is shown in FIG. 1 in two different positions. In the horizontal position, as shown here, the change arm is suited for exchanging the blow mold devices. In the vertical illustration, as shown in FIG. 1, the change arm is suitable for replacing elements of the heating device, such as heating mandrels.

Reference 70 marks a first magazine device, in which elements of the heating device can be placed down. Reference 71 marks a second magazine device, in which elements of the reshaping device, such as in particular the blow mold devices, can be placed down.

In the embodiment shown in FIG. 1, the changing device which is used in apparatus 1 for changing the blow molds is also used for changing, for example, heating mandrels and shielding plates on heating device 50. This way, the existing changing device can remain in use and be better utilized.

With this, a changing device 40 or a robot respectively preferably carries out the change of all handling parts.

Here, the changing device 40 is arranged in a fixed position between the heating device 50 and the reshaping device 1 and can reach both machine modules with the change arm 54. Here, the change arm is preferably equipped with a changeable treatment head 51, 53, which allows for the handling device or the gripping element to be changed and placed down independently. With this, at least one treatment head is intended for the heating device and at least one treatment head is intended for the reshaping device in this embodiment.

Figure 2:
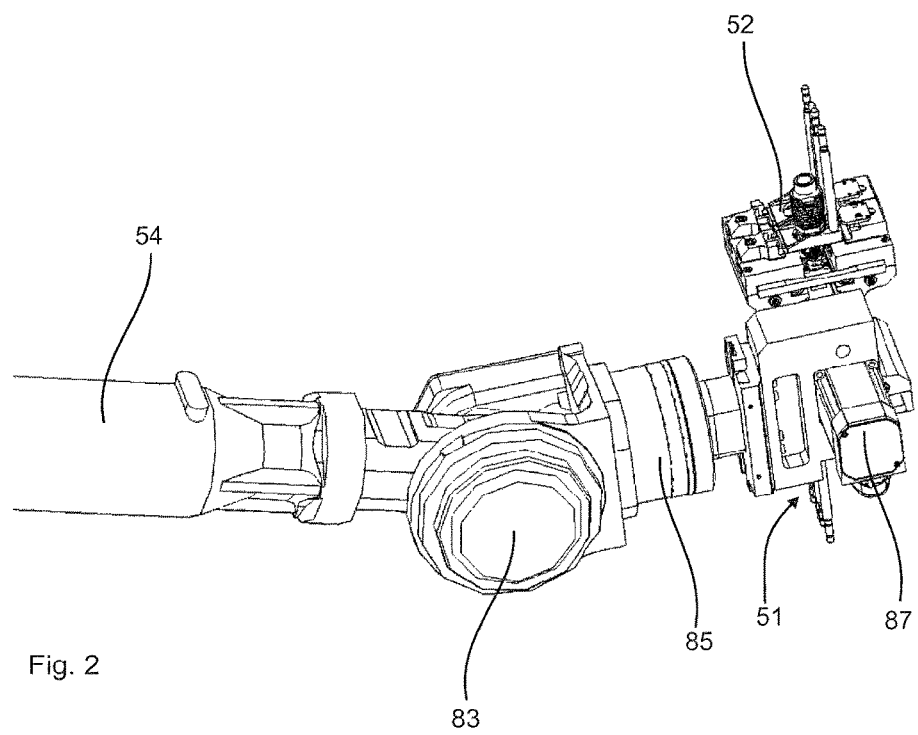
FIG. 2 a detailed view of a robot arm.
Figure 3:
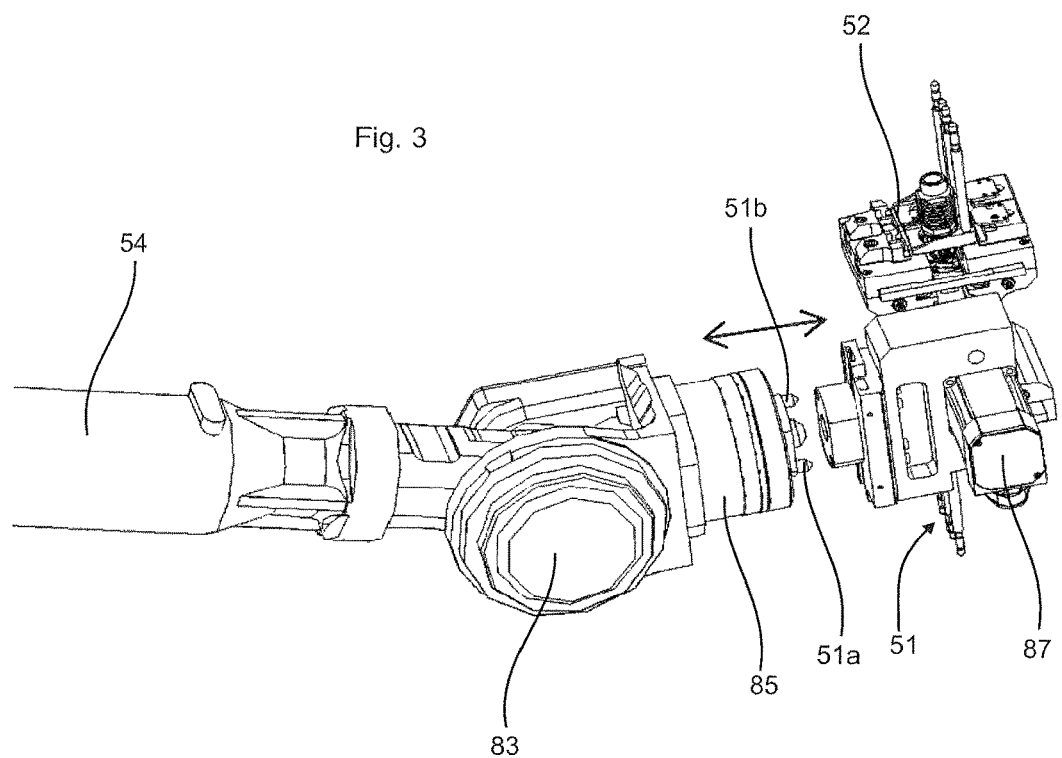
FIG. 3 the presentation from FIG. 2 with the gripping device removed.

FIGS. 2 and 3 show an example of a changeable treatment head such as this. A carrier 85 is arranged on the change arm 54 via a swivel joint 83 and on this carrier 85 in turn the treatment head 51 is arranged in an exchangeable manner. Reference 87 marks a motor, by means of which a rotating motion or swiveling motion respectively of treatment head 51 or 53 respectively can be achieved. As shown in FIG. 3, the treatment head or the changing element 51 respectively can be removed from carrier 85 and thus also from the arm 54. Reference 52 marks a gripping device.

FIG. 2 shows a treatment device or handling element, which is used for changing elements of the heating device 50, such as holding mandrels or shielding elements.

Furthermore, it would also be possible for treatment heads such as these, for example including their media couplings for pneumatics and hydraulics but also for the controls and power supply by the change arm to be placed down and connected independently.

In the situation shown in FIG. 3, the treatment head or changing element 51 is removed from its carrier. References 51a and 51b refer to connection elements, which are used, for example, for creating a hydraulic or pneumatic but also electric connection. These connection elements 51a,b are preferably designed in such a way, that the treatment head can be attached and/or removed to and from carrier 85 with a straight relative movement in direction X. In addition, locking elements (not pictured) can be provided, with which the treatment head can be locked to carrier 85.

Figure 4:
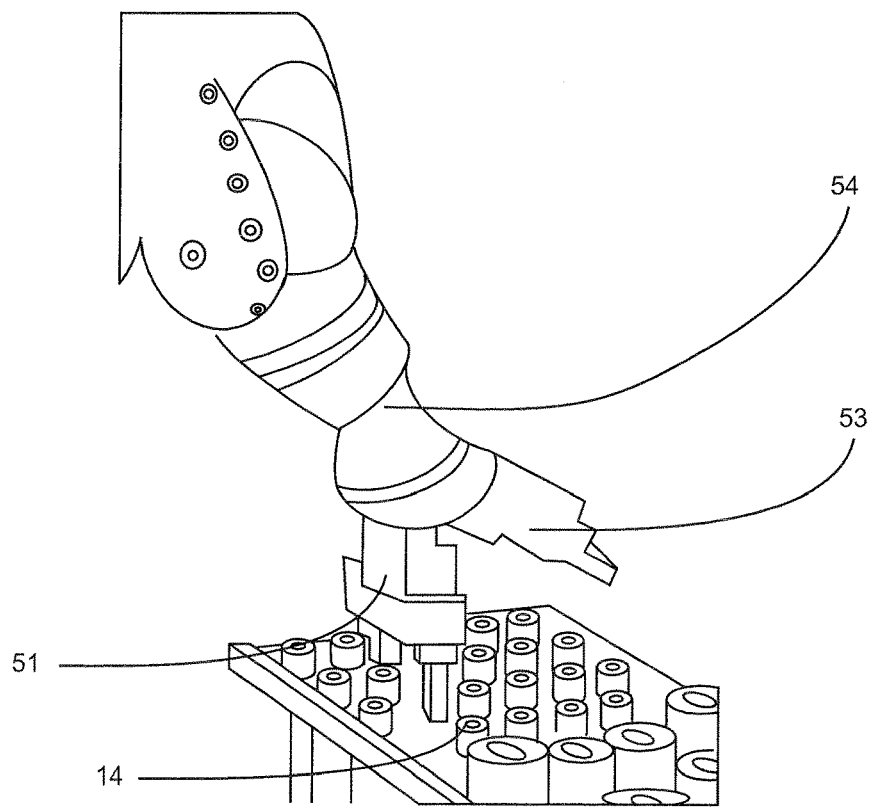
FIG. 4 a presentation of a changing device with two gripping elements.

FIG. 4 shows an example of a combined treatment device. Two changeable elements 51 and 53 are provided and arranged together on arm 54. As such, changeable element 51 or treatment head 53 respectively can be used for changing the blow mold and treatment element 51 can be used for changing heating mandrels. This has the advantage that the treatment heads 51 and 53 do not have to be replaced in the robot arm 54.

Figure 5:
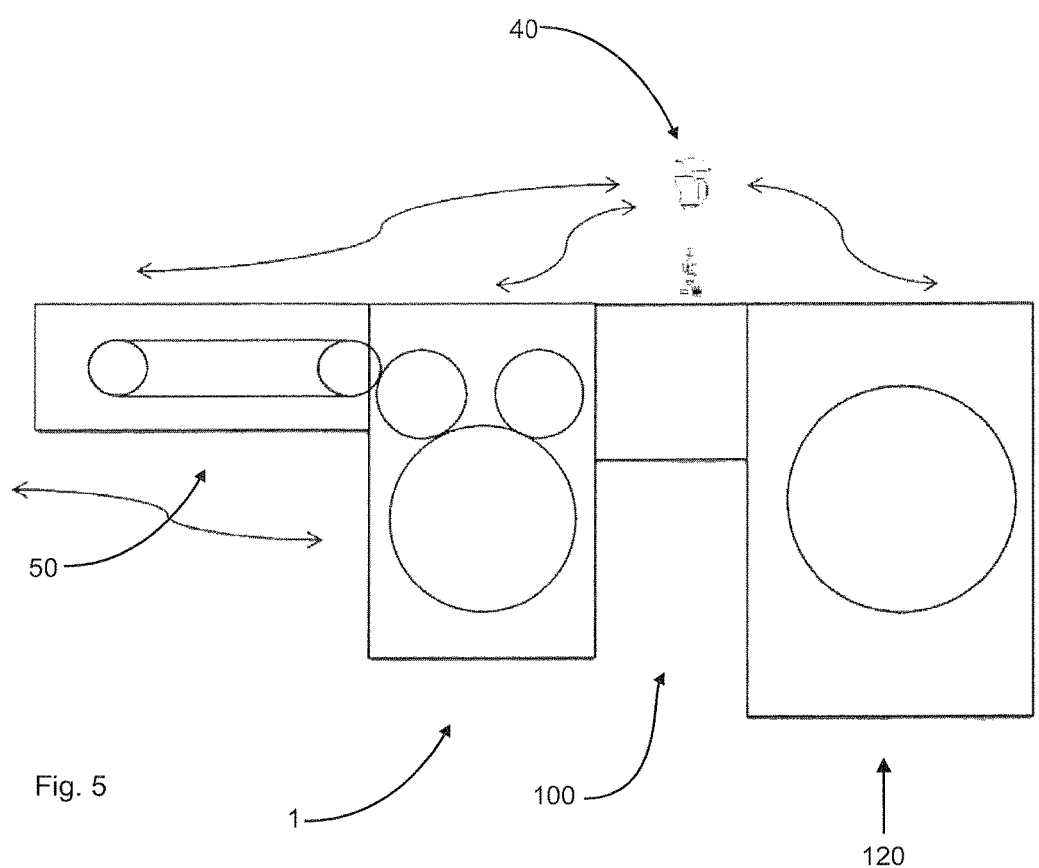
FIG. 5 a further presentation of a system according to the invention.

FIG. 5 schematically shows a further arrangement 100 for the production of plastic containers. In this embodiment, the changing device 40 is arranged in such a way that it can be moved, for example on a cart that can be moved freely or on rails. This way, the changing device 40 can be used for the heating device 50 as well as the reshaping device 1 and possibly even for aggregates that follow, such as a filling device 120. This way, it would even be possible to use the changing device for an entire plant.

As mentioned, it is possible that the changing device is not provided on a cart that can be moved freely but on a fixed rail or guide system. This guide system allows for the changing device to be moved in defined positions via defined driveways. This way, a central area for storing the handling parts, i.e. a handling part storage place, can be created. In this case, the changing device preferably always picks the handling parts, which are necessary for the corresponding replacement, up onto its cart and preferably stores them temporarily. This way, magazines for the handling parts which take up space on the machines can be forgone, wherein magazines for the handling parts such as these often have the disadvantage that they obstruct access to the machine. Generally, the changing device preferably comprises a magazine for receiving elements of the reshaping device and/or elements of the heating device, which is attached to the changing device at least temporarily, so that they can be moved together.

Figure 6:
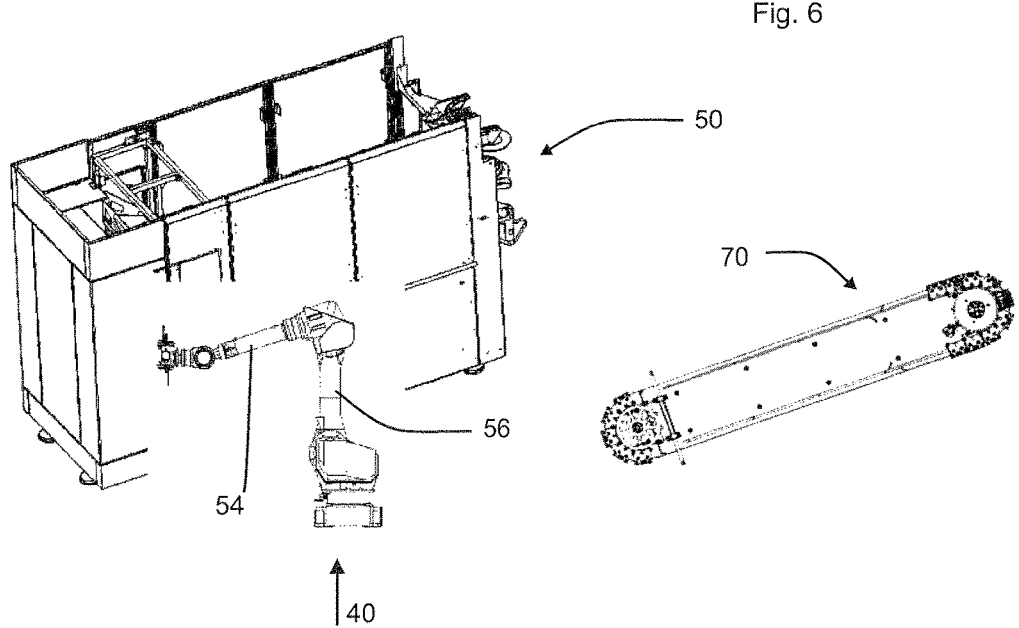
FIG. 6 a presentation of a changing device with a magazine.

FIG. 6 shows an example of a changing device 40. Again, the changing device 40 is provided here for example stationary. It can reach into the area of a heating device 50 and take over heating mandrels, for example. These parts can be placed down in a magazine 70. For instance, it is possible for the changing device 40 to attach a treatment head, which is attached to the robot arm, to a heating mandrel and a shielding plate in the rear area of the heating device (in order to replace it). Reference 56 marks an additional arm of the changing device, on which the arm 54 (so that it can be swiveled or moved in general) is arranged.

FIG. 7 shows a detailed presentation of a changing area of a heating device 50. This heating device comprises a multitude of carriers 92, which each carry heating mandrels 96. Reference 98 refers to shielding elements, such as shielding plates, which can also be removed from carrier 92. The shielding plates can be detached with the help of releasing device 90.

FIG. 8 shows the respective heating mandrels 96 which are attached to the corresponding base bodies 94 and detachable. In the presentation on the right in FIG. 8, the heating mandrel 96 has just been removed.

FIG. 9 shows the detachment of a shielding element 98, such as a shielding plate (also from carrier 92). It is possible for a device for heating mandrel 96 and shielding plate 98, which is fixed in the heating device, to release the handling parts, as well. The opening motions can, for example, be initiated by pneumatic cylinders. The handling parts can then be picked up by the handling of the changing device and inserted again.

FIGS. 10 and 11 show a treatment device 51 or 53. These treatment devices or treatment heads are built in such a way that they can simultaneously pick up at least two shielding plates 98 and also at least two heating mandrels 96. These treatment heads are preferably arranged mirror-symmetrically. This way, the changing device can be swiveled by 180° after removing a handling set A, in order to insert or attach a handling set B. FIG. 11 also shows a drive unit 95, which causes this swiveling or rotating motion of treatment head 53.

Figure 12:
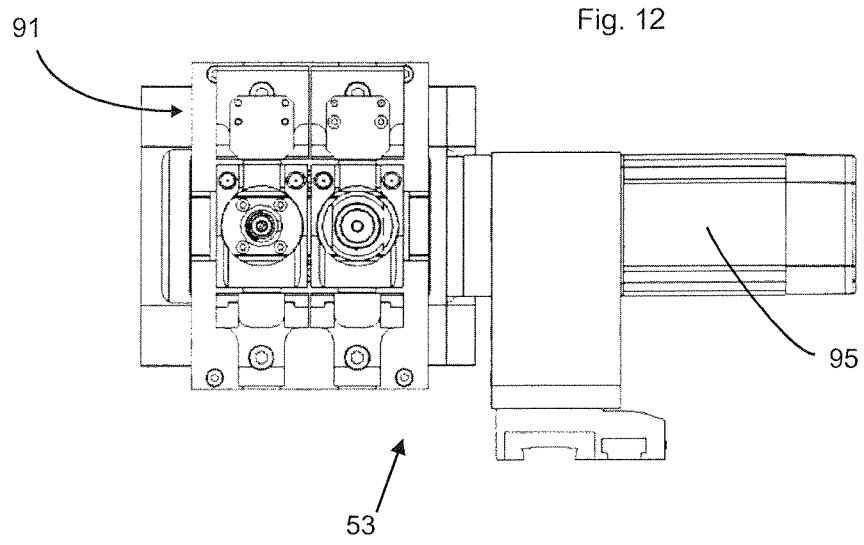
FIGS. 12-14 three presentations of a gripping device.
Figure 13:
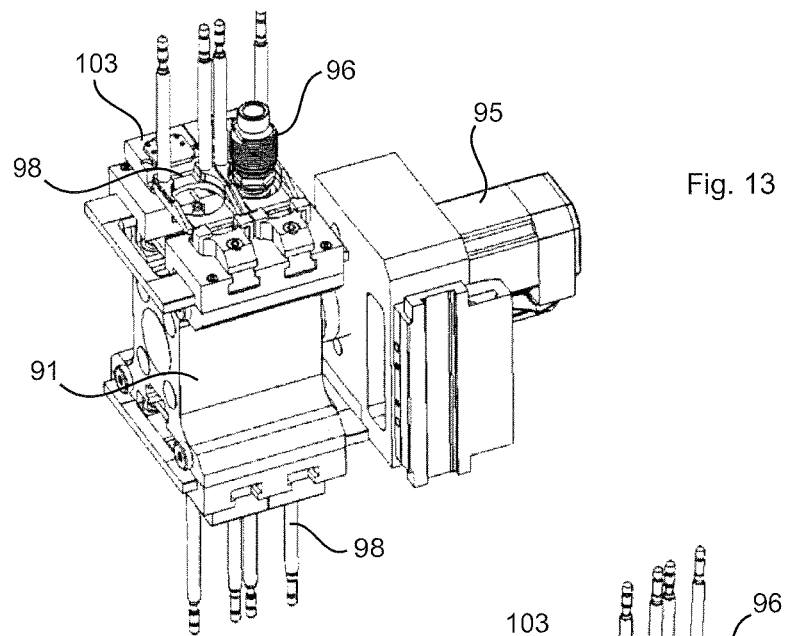
Figure 14:
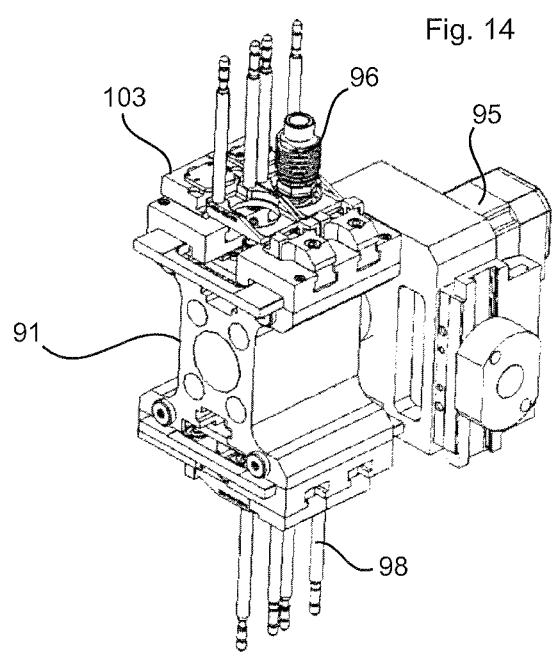

FIGS. 12-14 show three presentations of this treatment head 53. This treatment head has a base carrier 91, which—as described above—can be swiveled by 180° via drive unit 95. The handling parts, which are to be changed, can each be arranged on both sides of this head. Clamping mechanisms, which, for example, temporarily hold the shielding plates 98 and the mandrels 96 for transport, can be provided. These are favorably active holding elements, i.e. an engagement with the parts to be changed can be loosened or tightened.

Reference 103 marks a engaging element which can be moved with respect to the base carrier, with which the shielding elements and/or the heating mandrels 96 can be held. This engaging element can be moved by pneumatic, hydraulic and/or electric drive units.

Figure 15:
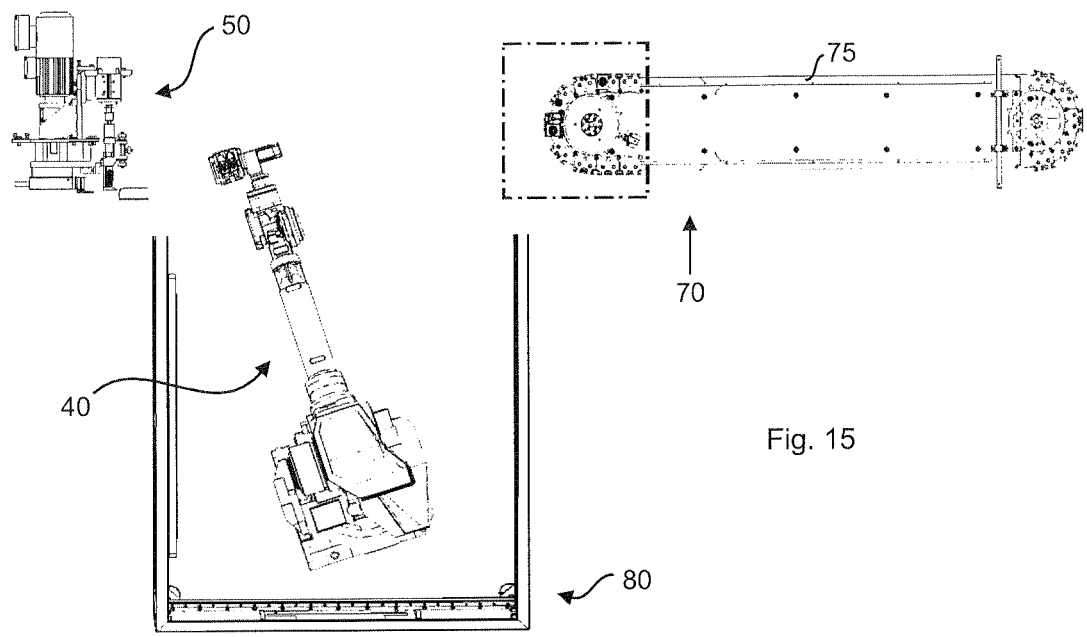
FIG. 15 a presentation as an illustration of the process of replacing the heating device.

FIG. 15 shows an additional presentation as an illustration of the process of changing handling parts of the heating device 50. In this case, the changing device 40 is arranged inside of a protective case 80. In addition, as magazine a handling part magazine 70 is used, which itself has a transport device 75 for transporting the handling parts. The advantage of a handling part magazine of this type over a fixed storage system is that the storage location in the room can always be the same, which means unnecessarily long travel distances and times can be avoided.

Figure 16:
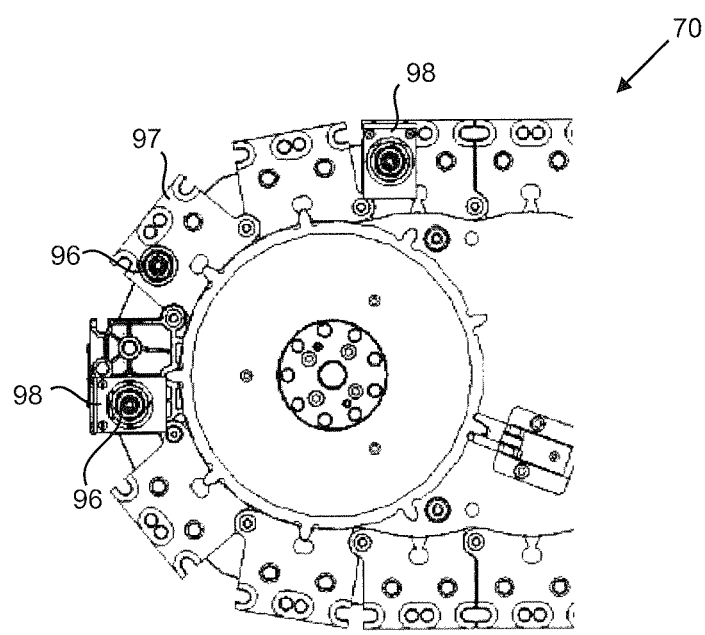
FIG. 16 a presentation of a magazine device.

FIG. 16 shows a detailed presentation of this handling part magazine 70. Preferably, this handling part magazine can arrange at least two heating mandrels and also at least two shielding plates on each magazine member. This makes replacing the handling parts easier. Reference 97 marks each carrier for the respective handling parts.

Figure 17:
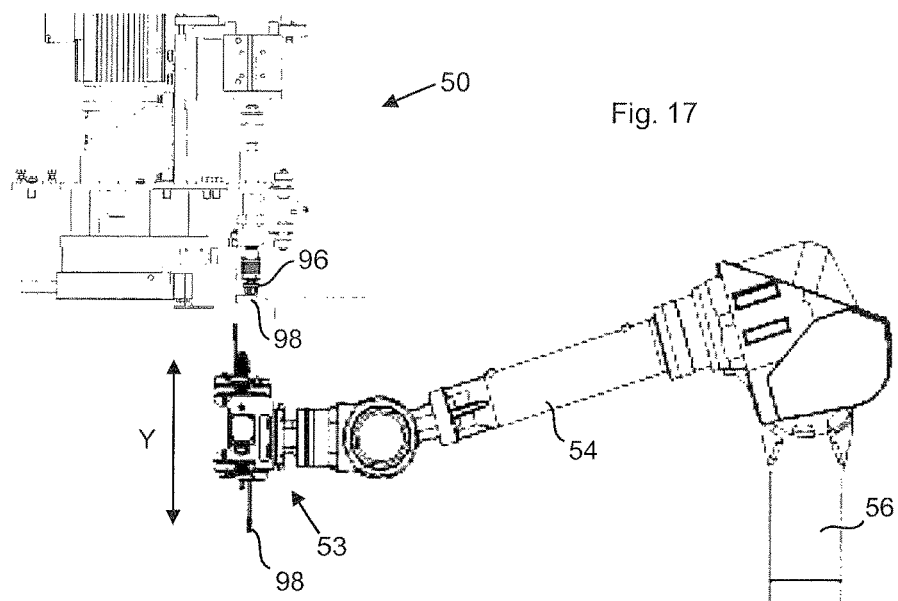
FIG. 17 a presentation as an illustration of the process of changing a part.

FIG. 17 shows a presentation as an illustration of the process of changing a handling part. Here, the change arm 54 is essentially moved upwards vertically (cf. double arrow Y) by the respective joints, in order to exchange the handling parts, here heating mandrels 96 and shielding plates 98. It is possible to, at first, remove the existing handling parts 96 and 98, then turn the changing element 53 by 180° in order to arrange immediately the new handling parts on the heating device 50.

Figure 18:
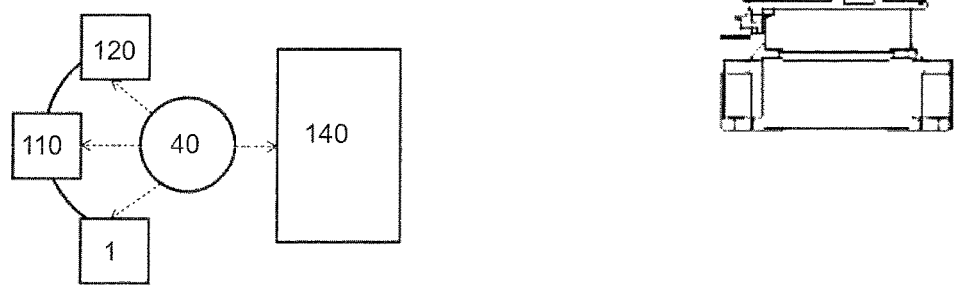
FIG. 18 a presentation of another advantageous arrangement.

FIG. 18 shows a crude schematic presentation of a plant 1 according to the invention. Here in turn a blow mold machine 1 is intended, however, an additional treatment device 110—here in the form of a labeling machine—is also possible. In addition, a filling device 120 is intended. Changing device 40 can be moved between apparatus 1, 110 and 120 in order to carry out treatment tasks there.

Reference 140 marks a handling part storage in which for example various handling parts such as gripping elements or holding mandrels can be stored.

Figure 19:
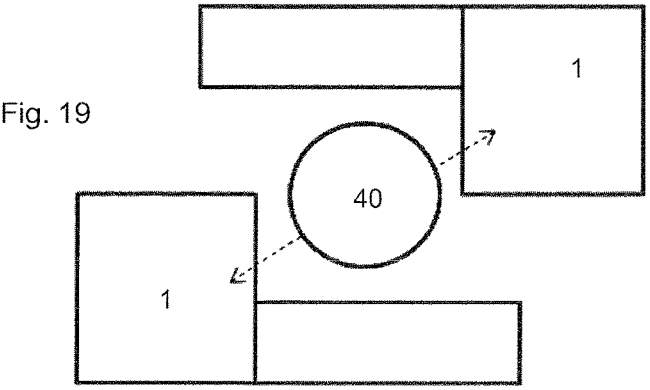
FIG. 19 a presentation of another advantageous arrangement.

In the situation shown in FIG. 19, the changing device 40 can be moved between a first apparatus 1 for reshaping plastic preforms into plastic containers and a second apparatus 1 for reshaping plastic preforms into plastic containers in order to alternatingly carry out changes or other treatment processes on these two apparatus.

The applicant reserves the right to claim all features mentioned in the application documents as essential to the invention, provided they are new, compared to the state of the art, either individually or in combination.

REFERENCE LIST 1 apparatus for reshaping plastic preforms
2 transport device
8 reshaping station
10 plastic preforms
12 station carrier
14 blow mold device
16 blow mold carrier
40 changing device
49 transport device of the heating device
50 heating device
51, 53 treatment head
51a, 51b connection elements
54, 56 arm
70, 71 magazine
75 transport device of magazine 70
80 protective case
85 carrier
87 drive, motor
90 releasing device
92 carrier
94 base body
95 drive unit
96 heating mandrel
97 carrier
98 shield element
100 plant
103 gripping element
110 labeling machine
120 filling device
140 storage device, handling part storage
A, B handling sets
X,Y directions

The invention claimed is:

1. An apparatus for reshaping plastic preforms into plastic containers with a heating device for heating the plastic preforms, wherein the heating device has a transport device for transporting the plastic preforms with a multitude of holding elements for holding the plastic preforms, said apparatus including a device for reshaping the plastic preforms into the plastic containers, which is arranged downstream of the heating device in the transport direction of the plastic preforms, wherein the reshaping device includes a transport device which transports the plastic preforms along a preset transport path and wherein the transport device has a station carrier, which is movable and is arranged at least indirectly on a stationary base carrier and on which a multitude of reshaping stations is arranged, wherein the reshaping stations each have blow mold devices, which each form cavities, in which the plastic preforms can be reshaped into the plastic containers, and wherein the blow mold devices are each arranged on blow mold carriers, wherein
the apparatus has a changing device, which is adapted for also removing the blow mold devices from their blow mold carriers and/or attaching the blow mold devices to the blow mold carriers, wherein the changing device has at least one swivally mounted change arm carrying a swivally mounted treatment device as well as a second arm having at least one gripping device attached to the change arm in a changeable manner, wherein said swivally mounted treatment device is attached to the change arm in a removable manner, and wherein the gripping device is directly arranged on the second arm that can be swiveled around a predefined first swivel axis, due to its arrangement in the changing device, and wherein the gripping device is arranged on the second arm in such a way, that it can be swiveled or rotated, and the first and the second arm being swivally connected to each other, whereby to allow for the gripping device, which is used for gripping a blow mold device, to be exchanged with a gripping device, which is used for gripping a changing element of the heating device, and wherein the changing device is adapted to exchange respective gripping devices independently by itself, so that in this way, a largely automatic changing operation regarding the apparatus for reshaping plastic preforms as well as regarding the heating device may be achieved, wherein the changing device is arranged on a moveable cart having a parts storage area, and wherein the changing device is further adapted for removing one changeable element of the heating device from the heating device and storing the removed element on the parts storage area, and/or attaching a changeable element from the parts storage area to the heating device, wherein the heating device has a locking device or locking elements respectively, which lock an exchangeable changing element with respect to the heating device or a carrier respectively, wherein at least two parts of the blow mold device can be locked together, so that the blow mold can be removed from the blow mold devices or the blow mold carrier respectively in its entirety.

2. The apparatus according to claim 1,
wherein
the change arm can be moved into a first changing position, in which it can grip the blow mold devices as well as into a second changing position, in which it can grip the changeable element of the heating device.

3. The apparatus according to claim 1,
wherein
the changing device has at least one gripping device for gripping the blow mold devices.

4. The apparatus according to claim 3,
wherein
the gripping device is arranged on the change arm in a changeable manner.

5. The apparatus according to claim 1,
wherein
the movable cart is movable on rails along the predefined path positioned proximate to the heating device, the device for reshaping, and at least one stationarily-positioned magazine device for storing blow mold devices and storing a changeable element.

6. The apparatus according to claim 1,
wherein
the changeable element of the heating device is selected from the group consisting of a holding mandrel for holding the plastic preforms, a holding bracket for holding the plastic preforms, and a shield element for shielding off parts of the plastic preforms from heat.

7. The apparatus according to claim 1,
wherein
the device for reshaping has at least one magazine device for storing blow mold devices and/or
storing of an changeable element.

8. A container treatment plant comprising an apparatus according to claim 1, and an additional treatment device for treating containers,
wherein
the treatment device has a changing device which is suitable and intended for changing at least one expendable material and/or at least one handling part of this additional treatment device.

9. The container treatment plant according to claim 8,
wherein
the changing device, which is suitable and intended for at least removing the blow mold devices from their blow mold carriers and/or attaching blow mold devices to the blow mold carriers, is also suitable and intended for changing at least one expendable material or at least one handling part of this additional treatment device.

10. The container treatment plant according to claim 8,
wherein
the additional treatment device is selected from a group consisting of a manufacturing device for manufacturing plastic preforms, a filling device for filling containers, a labeling device for labeling containers, a grouping device for creating groups of containers, a packaging device for packaging several containers, and a closing device for closing containers.

11. The container treatment plant according to claim 8,
wherein
the at least one changing device is movable between at least two treatment devices.

12. The container treatment plant according to claim 8,
wherein
the container treatment plant comprises at least one storage device for storing handling parts and/or expendable materials.

13. The container treatment plant according to claim 12,
wherein
the at least one changing device is suitable and intended for removing handling parts and/or expendable materials from the storage device and/or adding handling parts and/or expendable materials to the storage device.

14. A method for the production of plastic containers, wherein plastic preforms are heated with a heating device and transported with a transport device during the heating thereof, wherein the transport device comprises a multitude of holding elements for holding the plastic preforms and wherein the plastic preforms are expanded and reshaped into the plastic containers with a device for reshaping after having been heated, wherein the reshaping device comprises a transport device which transports the plastic preforms along a predefined transport path and wherein the transport device comprises a station carrier, which can be moved and is arranged at least indirectly on a stationary base carrier and on which a multitude of reshaping stations is arranged, wherein the reshaping stations each comprise blow mold devices, which each form cavities, in which the plastic preforms are reshaped into the plastic containers, wherein the blow mold devices are each arranged on blow mold carriers, providing a changing device, arranged on a movable cart having a parts storage area, said changing device having at least one swivally mounted change arm carrying a swivally mounted treatment device as well as a second arm having at least one gripping device attached to the change arm in a changeable manner, and wherein the gripping device is directly arranged on the second arm that can be swiveled around a predefined first swivel axis, due to its arrangement in the changing device, and wherein the gripping device is arranged on the second arm in such a way, that it can be swiveled or rotated, and the first and the second arm being swivally connected to each other, wherein said swivally mounted treatment device is attached to the change arm in a removable manner, whereby to allow for the gripping device, which is used for gripping a blow mold device, to be exchanged with a gripping device, which is used for gripping a changing element of the heating device, and wherein the changing device is adapted to exchange respective gripping devices carried on the parts storage area independently by itself, so that in this way, a largely automatic changing operation regarding the apparatus for reshaping plastic preforms as well as regarding the heating device is may be achieved, at least temporarily removes the blow mold devices from their blow mold carriers and/or attaches blow mold devices to the blow mold carriers, wherein this changing device at least temporarily removes at least one exchangeable element of the heating device from the heating device or attaches an exchangeable element to the heating device, wherein the heating device has a locking device or locking elements respectively, which lock the exchangeable changing elements with respect to the heating device or a carrier respectively, wherein at least two parts of the blow mold device can be locked together, so that the blow mold can be removed from the blow mold devices or the blow mold carrier respectively in its entirety.

15. The method according to claim 14,
wherein
an operating element of the changing device is at least temporarily moved into the working area of the heating device and an operating element of the changing device is at least temporarily moved into a working area of the reshaping device.

16. The apparatus according to claim 1, wherein the locking device is adapted to be released by the changing device independently and, if necessary, locked-automatically or independently.

17. The apparatus according to claim 1, wherein the changing device is adapted to firstly release a lock and then to relock after the element to be exchanged is inserted.

18. The apparatus according to claim 1, wherein the heating device has releasing mechanisms or locking mechanisms respectively adapted to enable or prevent respectively a change of the respective handling part or element to be exchanged respectively.

19. The method according to claim 14, wherein the locking device is released by the changing device independently and, if necessary, locked-automatically or independently.

20. The method according to claim 14, wherein the changing device firstly releases a lock and then the element to be exchanged is inserted and locks the locking mechanism.

21. The method according to claim 14, wherein the heating device has releasing mechanisms or locking mechanisms respectively that enable or prevent respectively a change of the respective handling part or element to be exchanged respectively.

22. An apparatus for reshaping plastic preforms into plastic containers with a heating device for heating the plastic preforms, wherein the heating device has a transport device for transporting the plastic preforms with a multitude of holding elements for holding the plastic preforms, said apparatus including a device for reshaping the plastic preforms into the plastic containers, which is arranged downstream of the heating device in the transport direction of the plastic preforms, wherein the reshaping device includes a transport device which transports the plastic preforms along a preset transport path and wherein the transport device has a station carrier, which is movable and is arranged at least indirectly on a stationary base carrier and on which a multitude of reshaping stations is arranged, wherein the reshaping stations each have blow mold devices, which each form cavities, in which the plastic preforms can be reshaped into the plastic containers, and wherein the blow mold devices are each arranged on blow mold carriers, wherein
        the apparatus has a changing device, which is adapted for also removing the blow mold devices from their blow mold carriers and/or attaching the blow mold devices to the blow mold carriers, wherein the changing device has at least one swivally mounted first change arm carrying a swivally mounted treatment device as well as a second arm having at least two gripping devices attached to the change arm in a changeable manner, wherein said swivally mounted treatment device is attached to the change arm in a removable manner, and wherein the gripping device is directly arranged on the second arm that can be swiveled around a predefined first swivel axis, due to its arrangement in the changing device, and wherein the gripping device is arranged on the second arm in such a way, that it can be swiveled or rotated, and the first and the second arm being swivally connected to each other, whereby to allow for the gripping device, which is used for gripping a blow mold device, to be exchanged with a gripping device, which is used for gripping a changing element of the heating device, and wherein the changing device is adapted to exchange respective gripping devices independently by itself, so that in this way, a largely automatic changing operation regarding the apparatus for reshaping plastic preforms as well as regarding the heating device may be achieved, wherein the changing device is arranged on a moveable cart having a parts storage area, and wherein the changing device is further adapted for removing one changeable element of the heating device from the heating device and storing the removed element on the parts storage area, and/or attaching a changeable element from the parts storage area to the heating device, wherein the heating device has a locking device or locking elements respectively, which lock an exchangeable changing element with respect to the heating device or a carrier respectively, wherein at least two parts of the blow mold device can be locked together, so that the blow mold can be removed from the blow mold devices or the blow mold carrier respectively in its entirety.

* * * * *